(12) United States Patent
Brooks et al.

(10) Patent No.: US 12,135,553 B2
(45) Date of Patent: Nov. 5, 2024

(54) ROBOTIC CART

(71) Applicant: Robust AI, Inc., San Carlos, CA (US)

(72) Inventors: Rodney Allen Brooks, San Francisco, CA (US); Anthony Sean Jules, Hillsborough, CA (US); Leila Takayama, Palo Alto, CA (US)

(73) Assignee: Robust AI, Inc., San Carlos, CA (US)

( * ) Notice: Subject to any disclaimer, the term of this patent is extended or adjusted under 35 U.S.C. 154(b) by 323 days.

(21) Appl. No.: 17/538,668

(22) Filed: Nov. 30, 2021

(65) Prior Publication Data

US 2023/0168679 A1    Jun. 1, 2023

(51) Int. Cl.
| | |
|---|---|
| *G05D 1/00* | (2024.01) |
| *B60B 19/00* | (2006.01) |
| *B60P 3/20* | (2006.01) |
| *B62B 5/00* | (2006.01) |
| *B66F 9/075* | (2006.01) |
| *B66F 9/19* | (2006.01) |

(52) U.S. Cl.
CPC ......... *G05D 1/0214* (2013.01); *B62B 5/0069* (2013.01); *B66F 9/0759* (2013.01); *G05D 1/0246* (2013.01); *G05D 1/0274* (2013.01); *B60B 19/003* (2013.01); *B60P 3/20* (2013.01); *B66F 9/19* (2013.01)

(58) Field of Classification Search
CPC ...... G05D 2201/0216; B60W 2300/40; B60W 60/001
See application file for complete search history.

(56) References Cited

U.S. PATENT DOCUMENTS

| | | | |
|---|---|---|---|
| 10,919,555 B1* | 2/2021 | Spruill | B62B 5/0046 |
| 11,099,562 B1* | 8/2021 | Ebrahimi Afrouzi | ........................ G05D 1/0276 |
| 2017/0001656 A1* | 1/2017 | Katayama | A61H 3/04 |
| 2018/0001946 A1* | 1/2018 | Yokoya | B62D 57/028 |
| 2018/0101179 A1 | 4/2018 | Louey et al. | |

(Continued)

FOREIGN PATENT DOCUMENTS

| | | |
|---|---|---|
| JP | 2021175631 A | 11/2021 |
| WO | 2023102319 A1 | 8/2023 |

OTHER PUBLICATIONS

Huang, Feixiang; Robotic Delivery System for Material Handling [Master's Thesis, University of Akron], Dec. 2014.

(Continued)

*Primary Examiner* — Jaime Figueroa
*Assistant Examiner* — Jerrod Irvin Davis
(74) *Attorney, Agent, or Firm* — Polygon IP, LLP

(57) ABSTRACT

This application describes systems, devices, computer readable media, and methods for the function and operation of robotic carts. A robotic cart may include a base component configured for the receipt of a payload, a battery unit, and a mobility apparatus. The robotic cart may include a handlebar component coupled with the base component. The handlebar unit may include a sensor unit configured to transmit a hand detection message when the handlebar unit is grasped by one or more hands and to transmit a force direction message indicating a two-dimensional direction associated with a directional force applied by one or more hands. The robotic cart may be configured to map the area around it and to autonomously move the robotic cart along a path to perform a task.

24 Claims, 15 Drawing Sheets

(56) References Cited

U.S. PATENT DOCUMENTS

| | | | |
|---|---|---|---|
| 2018/0354539 A1* | 12/2018 | Casey | B62B 5/0033 |
| 2019/0217477 A1* | 7/2019 | Paepcke | B25J 9/1679 |
| 2020/0189120 A1* | 6/2020 | Weaver | G05B 19/4189 |
| 2020/0401133 A1* | 12/2020 | Armbrust | G05D 1/0214 |
| 2021/0138912 A1 | 5/2021 | Yamasaki et al. | |
| 2021/0155464 A1* | 5/2021 | Takai | B66F 7/065 |
| 2023/0050980 A1* | 2/2023 | Zahdeh | G01S 17/86 |

OTHER PUBLICATIONS

Mobile Autonomous Robotic Cart 3 Series Overview, 3 Series Data Sheet v220301A, retrieved on Jul. 22, 2022, https://www.multechnologies.com/hubfs/manuals/MARC_3_Series_data_sheet_2203a.pdf.

Scholz, Jonathan et al.; Cart Pushing with a Mobile Manipulation System: Towards Navigation with Moveable Objects, retrieved on Jul. 7, 2022, https://www.cs.cmu.edu/~maxim/files/cartplanner_icra11.pdf.

Wang, Ziyu; Autonomous Robotic Cart for Food Delivery on Airplane, [Master's Thesis, NYU Tandon School of Engineering], Fall 2017, retrieved on Jul. 22, 2022 http://engineering.nyu.edu/mechatronics/projects/MSprojects/2017-2018/4/report.pdf.

International Application Serial No. PCT/US22/79883, Search Report and Written Opinion mailed Feb. 3, 2023, 10 pgs.

\* cited by examiner

ROBOTIC CART

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to robotics, and more specifically to robotic carts capable of manipulating and/or transporting items.

DESCRIPTION OF RELATED ART

Robots are increasingly employed for performing a variety of tasks. However, many tasks otherwise capable of being completed by robots take place in environments in which humans are present. The presence of humans presents a significant problem for robotic solutions since humans behave in ways that are complex and difficult to predict. Accordingly, improved techniques for human-robot interaction are desired.

OVERVIEW

According to various embodiments, techniques and mechanisms described herein provide for systems, devices, computer readable media, and methods for the function and operation of robotic carts. A robotic cart may include a base component configured for the receipt of a payload and a battery unit comprising one or more batteries. A robotic cart may include a mobility apparatus coupled with the base component.

In some embodiments, robotic cart may include a handlebar component coupled with the base component. The handlebar unit may include a first sensor unit configured to transmit a hand detection message when the handlebar unit is grasped by one or more hands. The first sensor unit may be configured to transmit a force direction message indicating a two-dimensional direction associated with a directional force applied by one or more hands.

In some embodiments, the robotic cart may be configured to map the area around it. The robotic cart may include a second sensor unit configured to detect one or more objects in an area proximate to the robotic cart. The mapping sensor may be capable of transmitting one or more area mapping messages. The robotic cart may include a control unit configured to analyze the area mapping messages to determine a path through a physical space. For example, the robotic cart may map a path through a room to avoid collisions with objects in the room. The control unit may be configured to communicate with the robotic cart mobility apparatus to autonomously move the robotic cart along the path to perform a task. The control unit may be capable of changing to manual operation mode based on receiving a hand detection message at the handlebar sensor unit, and communicate with the mobility apparatus to move the robotic cart in accordance with the two-dimensional direction based on the force direction message.

In some embodiments, the robotic cart may be capable of communicating with the mobility apparatus to move the robotic cart in accordance with the two-dimensional direction involves determining whether such movement is predicted to cause a collision with the one or more objects. When it is determined that such movement is predicted to cause a collision with the one or more objects, the robotic cart may be configured to communicate with the mobility apparatus to avoid the collision. For example, the robotic cart may be configured to detect the presence of and avoid collision with a human.

In some embodiments, the robotic cart may include a display screen configured to display an indication of a status associated with the robotic cart. The display screen may be a touch screen display configured to receive user input and to transmit the user input to the control unit. For example, the display screen may be coupled with the handlebar component. As another example, the display screen may include an optical sensor configured to capture image data in an area proximate to the robotic cart. The robotic cart may be configured to process the image data to identify a human or other object.

In some embodiments, the robotic cart may include a handlebar component. The handlebar component may include two vertical bars coupled with the base component and one or more horizontal bars coupled with the two vertical bars. The horizontal bar may be coupled with the two vertical bars via two joint units. Each of the joint units may include a respective force torque sensor.

In some embodiments, the mobility apparatus may include four omnidirectional wheels that each include a plurality of rollers arranged around a rim. The second sensor unit may include a plurality of visible light cameras located on the base component. The plurality of visible light cameras may collectively provide a 360-degree view of the area proximate to the robotic cart. The plurality of visible light cameras are also configured to detect infrared light.

In particular embodiments, the first sensor unit may be further configured to detect a rotational force direction and transmit an indication of the rotational force direction to the control unit. The control unit may be further configured to communicate with the mobility apparatus to autonomously rotate the robotic cart in the rotational force direction about an axis. The first sensor unit may be further configured to detect a rotational force magnitude, and wherein the robotic cart may be autonomously rotated at a rotational rate corresponding with the rotational force magnitude.

BRIEF DESCRIPTION OF THE DRAWINGS

The included drawings are for illustrative purposes and serve only to provide examples of possible structures and operations for the disclosed inventive systems, apparatus, methods and computer program products for robotic transport solutions. These drawings in no way limit any changes in form and detail that may be made by one skilled in the art without departing from the spirit and scope of the disclosed implementations.

DETAILED DESCRIPTION

Figure 1:
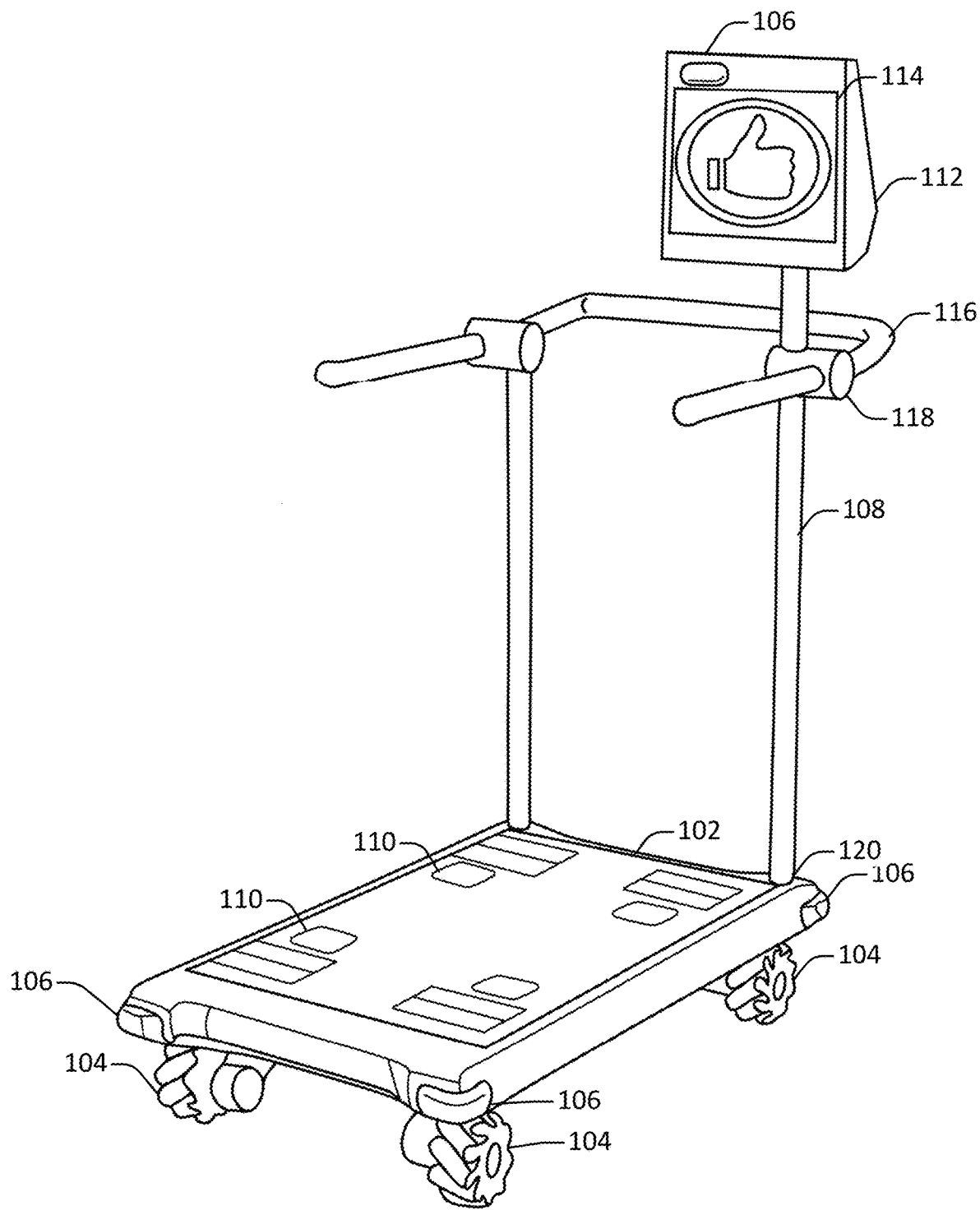
FIG. 1 illustrates a robotic cart, configured in accordance with one or more embodiments.

Techniques and mechanisms described herein are directed to a robotic cart capable of transporting items. The robotic cart may be capable of making decisions and taking actions based on social accommodation and prediction of human and non-human activity. The robotic cart may be equipped with a movement capability and may execute a task such as object manipulation within a physical environment. At the same time, the robotic cart may actively scan the environment to perform environmental mapping and to distinguish animate things (e.g., people, other robots, animals, forklifts, etc.) from inanimate things (e.g., tables, shelves, walls). The robotic cart may then predict the actions of animate things and respond accordingly.

In some implementations, a robotic cart may be configured to determine a course of action that is consistent with one or more governing principles. For example, a first principle may specify that a robotic cart will never collide with a person or perform an action such as falling over a cliff or down stairs that may cause the robotic cart to unintentionally collide with a person. As another example, a second principle may specify that a robotic cart must obey the commands of a human except where the robotic cart would violate the first principle. As yet another example, a third principle may specify that a robotic cart obeys fleet management instructions except insofar as it detects conditions such as low power or malfunction and takes steps to correct (e.g., moving to a recharging location) or otherwise respond to (moving to a safe location and activating an alert function) such conditions.

According to various embodiments, a robotic cart may be designed in a modular fashion in which the same basic design may be adapted to various configurations. For example, a robotic cart may include one or more cabinets, shelves, temperature-controlled containers, and/or other storage elements. As another example, a robotic cart may include one or more scissor lifts, conveyor belts, and/or other devices. As yet another example, a robotic cart may be configured to transport a human.

In particular embodiments, a robotic cart may be configured to transport a human in a variety of positions. For example, a robotic cart may be configured to transport a human in a hospital setting bed capable of accommodating a human in a supine, semi-sitting, or sitting position. In such a setting, a robotic cart may function as a bed that can perform operations such as being directed by an orderly in a force-assisted manner, being summoned to where it is needed, returning autonomously to a designated location when a patient is not on the bed, and/or avoiding collisions when operating in either a force-assisted or autonomous mode. As another example, a cart may be configured to transport a human standing on the cart.

In particular embodiments, a robotic cart may be configured to perform transport operations in a variety of settings. Such configurations may include, but are not limited to: a hotel luggage carrier, a cleaning supplies carrier, a restaurant food server, a restaurant dirty dish collector, a hotel room service provider, a towel or food carrier for poolside service, a pharmacy delivery robot within a hospital, a hospital room service provider, a hospital lab sample deliverer, an airport luggage storage and/or retrieval unit, a passenger luggage transporter, a mail and package delivery unit within a commercial or residential setting, a book transport unit within a library, a staging unit for trades such as construction or plumbing work, pallet delivery.

In particular embodiments, a robotic cart may be configured as a powered shopping cart. In such a configuration, a cart may associate itself with a particular human or humans, for instance when a human waves to the cart when entering a store. The robotic cart may then follow the human, allowing the human to use both hands to pick items. Items in the robotic cart may be detected by a scanner, which may update a running tally of items and price. The robotic cart may be configured to function in a socially adaptable way, for instance by getting out of the way of other shoppers and then catching up to the associated human when possible. The human may grab the cart by a handle bar to enter a manually operated mode, for instance to direct the cart into an elevator. The cart may be equipped to respond to verbal queries about the location of items, and/or lead a human to the location of an item within a store. The cart may be configured to follow a human to a location such as a vehicle, and then autonomously return to a designated location when the cart has been emptied.

According to various embodiments, a robotic cart may be designed in a modular fashion in which the same basic design may be adapted to various functionalities. For example, a robotic cart may be configured to perform door opening and/or closing. As another example, a robotic cart may be configured to pick up, transport, and/or relocate items. As another example, a robotic cart may be configured to load and/or unload items. As another example, a robotic cart may be configured to operate elevators, doors, and/or other devices. As another example, a robotic cart may be configured to scan barcodes, read RFID tags, and/or perform various inventory tracking tasks.

According to various embodiments, a robotic cart may be configured to be responsive to human interaction when the robotic cart occupies the same shared physical space as a human. For example, a robotic cart may be configured to avoid occupying a certain radius of physical space around a human. As another example, a robotic cart may be configured to avoid moving along a path predicted to intersect a human's predicted path.

In some embodiments, a robotic cart may be configured to respond to motion initiated by a human. For example, a robotic cart may approach a human who summons the robotic cart by waving in the robotic cart's direction. As another example, a robotic cart may be configured to follow a human along a path determined by the human to assist them with a task. For instance, a robotic cart may follow a human to assist the human by picking up or transporting items. As yet another example, a the robotic cart may be configured to lead the human to a destination. For instance, a robotic cart may help a new hire find the cleaning supplies closet or may lead a customer to the nearest customer service representative.

In some implementations, a robotic cart may determine whether to wait to resume a task or move onto another task based on, for instance, predicted human activity. For example, the robotic cart may predict that a human is likely to enter and quickly leave an area based on the human's movement along a path. In such a situation, the robotic cart may elect to wait for the human to pass and then resume the task. As another example, the robotic cart may predict that a social disruption is likely to be long-lasting, such as when a human is rearranging items in an area of a warehouse. In such a situation, the robotic cart may elect to move on to a different task. As another example, a robotic cart may determine that it should return a charging dock or rejoin a collection of other robotic carts when not in use for a designated period of time.

According to various embodiments, the robotic cart may strategically determine whether to employ active or passive waiting based on factors such as whether the area is crowded with people, the time required to switch between tasks, the time scheduled in which to complete one or more tasks, and/or instructions from humans. Similarly, the robotic cart may strategically communicate with humans based on factors such as whether the area is crowded with people, whether the robotic cart is in autonomous vs assistive mode, and whether the robotic cart is in need of assistance or direction. For instance, the motions of the robotic cart and/or the display on the robotic cart may change based on the proximity of humans.

According to various embodiments, as part of responding to the presence of a human or at any other time, a robotic cart may provide any of a variety of social cues. Examples of such cues may include, but are not limited to: lights, sounds, vibration, and movement. For example, a robotic cart may activate one or more lights and/or emit one or more sounds when a task is initiated. As another example, a robotic cart may make a verbal acknowledgment such as "ready to assist." As another example, a robotic cart may visually display words such as "ready to use", a symbol such as a "thumbs up", or an indicator such as a green light. As another example, a robotic cart may display or communicate visually or verbally that it is "unable to assist" or display a red light. As another example, a robotic cart may display or communicate verbally that it "requires assistance" when it senses a human approaching, for instance by flashing red lights, displaying a message, emitting a sound, or verbally requesting assistance.

In some embodiments, a robotic cart may communicate interactively with a human by providing any of a variety of social cues. Examples of such cues may include, but are not limited to: lights, sounds, vibration, and movement. For example, a robotic cart may respond to any nonverbal and/or verbal commands initiated by a human by acknowledging the command. As another example, in acknowledging a nonverbal or verbal commands given by a human, the robotic cart may initiate the task. As another example, the robotic cart may display a visual indicator in response to the verbal or nonverbal command. As another example, the robotic cart may communicate to confirm the nonverbal or verbal commands before proceeding with the task. For instance, the robotic cart may verbally repeat a verbal or nonverbal command, or provide a nonverbal visual cue such as a light or display to confirm a verbal or nonverbal command. As another example, a robotic cart may respond to a query initiated by a human. For instance, in response to a query about where an item is located, the robotic cart may respond by displaying the information or by physically guiding the human to the location of the item.

According to various embodiments, a robotic cart may be configured to operate cooperatively with one or more robotic carts. For example, one robotic cart may be configured to identify, select, and pick up an item, while another robotic cart may be configured to coordinate with the first robotic cart to receive the selected item and transport it to a different location, and yet another robotic cart is configured to receive another selected item to transport it to another different location. As another example, a robotic cart may be configured to request assistance from another robotic cart. For instance, a first robotic cart may communicate a request to another robotic cart to remove an obstruction from the first robotic cart's intended path.

According to various embodiments, a robotic cart may be configured to operate cooperatively with one or more robotic carts and one or more humans. For example, one robotic cart may receive verbal and/or nonverbal instructions from a human, while another robotic cart may be configured to coordinate autonomously with the first robotic cart and with other robotic carts to complete a task. For instance, a human operator might override the autonomous operation of the first robotic cart by, for example, grasping the handles of the robotic cart and using it as a manual cart. The first robotic cart may communicate to other robotic carts to carry on and complete a series of autonomous tasks.

According to various embodiments, a robotic cart may be configured to communicate information about its path and environment. For example, as a robotic cart enters unfamiliar or changed terrain, it may update and share a map of the terrain. For instance, the robotic cart may share an updated map indicating the presence of obstructions, a map of pathways, or the presence of humans in the space. The robotic cart may share this information with other robotic carts, other humans, a central management system, or other such information recipients.

According to various embodiments, a robotic cart may be configured to capture and share information about items in its environment. For example, a robotic cart may be configured to scan items and record them in an inventory. As another example, a robotic cart may be configured to scan a space and report the number of humans in the space. As yet another example, a robotic cart may be capable of determining that a space is not occupied by humans, and determine that it and other robotic carts may move freely and more quickly in an unoccupied space.

According to various embodiments, a robotic cart may be configured to perform operations to maintain its functionality. For example, a robotic cart may be configured to determine its own level of power supply, and return to a charging station when it is out of power. As another example, a robotic cart may be configured to run diagnostic tests on its system to ensure operability. For instance, a robotic cart may run tests on, update, and/or recalibrate any of the following to ensure operability: sensors, algorithms, and operating system. As another example, a robotic cart may be configured to re-calibrate algorithms continuously during operation. For instance, a robotic cart may re-calibrate an algorithm continuously based on changes to its environment, such as the number of humans in shared physical space, the number of other robotic carts that it may coordinate with, the average temperature of the environment, the lighting conditions of the environment, or the number of items in an environment.

According to various embodiments, a robotic cart may be configured to diagnose issues and resolve them. For example, a robotic cart may be configured to recognize when it is stuck and unable to move forward, and communicate a request for assistance. As another example, a robotic cart may be configured to run diagnostic tests on its system, and recover from system errors autonomously. As another example, a robotic cart may be configured to recover from errors by requesting assistance from other robotic carts. For instance, a robotic cart may request assistance in removing obstructions from its intended pathway.

According to various embodiments, a robotic cart may be configured to sense the approach and directionality of humans in a shared physical space. For example, a robotic cart may be configured with a one or more sensors capable of sensing humans and/or other aspects of its environment. As another example, a robotic cart may be configured to scan a person as they approach the robotic cart, and may be capable of using facial recognition to identify one or more persons. For instance, the robotic cart may recognize a person and address the person by name, and/or determine a set of commands the person is authorized to perform.

According to various embodiments, a robotic cart may be configured to be responsive to human physical interaction. For example, the hand railings on the robotic cart may be capable of sensing pressure, force, and/or torque, and respond accordingly to human physical direction. For instance, a robotic cart may be capable of pausing its autonomous operations when a human grasps a handrail, and convert from autonomous to manual mode. As another example, releasing the handrails of the robotic cart may communicate to the robotic cart that it is free to run autonomously and rejoin other robotic carts or return to a charging station.

In some implementations, the robot may be guided in its activity based on communication with a remote computing device such as a control computer having access to a database system. Alternatively, or additionally, the robot may report its actions to such a system.

In some implementations, the robot may coordinate with other robots. The other robots may be configured to perform complementary activities or may be focused on other tasks. Each robot may be directed by a central command and control apparatus. Alternatively, or additionally, the robots may communicate with each other directly.

In some implementations, the robot may communicate with nearby people. For example, the robot may receive instructions from a nearby person. As another example, the robot may receive instructions about social accommodation from a nearby person. The robot may be configured to verify the authority of the person to issue such instructions. For instance, the robot may be configured to ascertain the person's identity and/or role through any of various authentication mechanisms.

In some implementations, a robot may be equipped with semantic perception. Semantic perception may allow a robot to not only sense the presence of surfaces and objects in an environment, but also to identify the characteristics of those surfaces and objects. For example, people may be identified as such, and actions may be taken based on their anticipated behavior.

In some implementations, a robot may be equipped with multimodal perception. Multimodal perception may allow the robot to combine multiple approaches at the same time, for instance by performing one or more of sensing, movement, reporting, and/or social accommodation activities simultaneously or in close temporal proximity. Alternatively, or additionally, multimodal perception may allow the robot to combine input from different sensors such as one or more internal or remotely accessible microphones, cameras, gyroscopes, or other detecting devices. Accordingly, a robot may be equipped to conduct the flexible handling of objects, to develop and execute socially appropriate plans for interacting with an environment, and to adapt to new environments.

In some implementations, social accommodation allows a robot to treat humans differently than objects, allowing more natural and socially appropriate behavior. Velocity and trajectory information for humans can be used, allowing a robot to plan for where they are likely to be, and not merely where they are now. In addition, a robot can signal to humans in various ways to help alert humans to the current and future behavior of the robot.

In some implementations, a robot may be equipped to identify, create, and use two-dimensional (2D) and/or three-dimensional (3D) maps. For example, a robot may map annotations of regions such as aisles and departments in a store. As another example, the robot may perform continuous maintenance of maps over time. As yet another example, the robot may identify corridors and preferred routes for navigation, for instance based on past experience. Dynamic objects may be handled separately from fixed objects, and humans may be tracked based on fusing information from multiple sensors.

In particular embodiments, a robot can also perform tasks in a socially aware way, for instance by recognizing individuals based on role and/or identity, and then treating individuals differently based on those roles and/or identities. For example, a robot may be configured to respond to instructions from maintenance workers and administrators. However, the robot may be less accommodating of other individuals, such as members of the general public.

FIG. 1 illustrates a robotic cart 100, configured in accordance with one or more embodiments. The robotic cart 100 includes a base 102, a mobility apparatus 104, one or more sensors 106, and a hand rail 108.

According to various embodiments, the mobility apparatus may include one or more wheels, treads, legs, brakes, or other such elements. For example, in some configurations the robotic cart may include four Mecanum wheels, as shown in FIG. 1. However, other configurations of the mobility apparatus are possible.

The robotic cart base 102 may include one or more attachment points 110. According to various embodiments, an attachment point may provide one or more elements for adding a component or components to the base. Such elements may include, but are not limited to: power couplings, communication interfaces, and physical connection points. For example, power may be provided via a plug interface or via inductive charging. As another example, a communication interface may be configured to connect via Universal Serial Bus (USB) or any other suitable protocol. As yet another example, a physical connection point may be configured to connect a payload to the robotic cart via one or more bolts, clips, snaps, screws, or other such mechanical fasteners. The components that may be connected via such attachment points may include, but are not limited to: scissor lifts, shelving units, robotic arms, refrigeration units, cabinets, and conveyer belts.

According to various embodiments, sensors 106 may be located on the corners and/or edges of the base. The types of sensors may include, but are not limited to: optical sensors, stereo cameras, time-of-flight depth sensors, structured light depth sensors, sonar sensors, and lidar sensors. The robotic cart may be configured in a flexible way to incorporate various types of hardware and software sensor configurations.

In particular embodiments, sensor data may be processed by localized processing units such as circuit boards housing ARM processors located near the sensors. For instance, localized processing units may be equipped to implement the OpenCV framework for sensor data processing.

According to various embodiments, the base 102 may include one or more batteries, charging interfaces, communication interfaces, and/or central processing units (not shown). A central processing unit may receive information from a communication interface and the sensors 106 to determine a course of action. For example, the central processing unit may determine a path along which the robotic cart is to travel. As another example, the central processing unit may determine one or more instructions to transmit to a communication-equipped payload unit attached to the robotic cart. As yet another example, the central processing unit may determine one or more instructions to transmit to the human communication interface 114. As still another example, the central processing unit may determine one or more messages to transmit to a remote machine via a communication interface.

In particular embodiments, one or more sensors may be configured to detect irregularities in the floor around the robotic cart. Such irregularities may include, but are not limited to: stairs, walls, cliffs, bumps, and holes. The robotic cart may be configured to not select a course of action that would cause the cart to traverse such an irregularity in order to avoid, for instance, falling off a cliff or down stairs, jostling a payload by traversing a bump, or having a wheel become stuck in a hole.

According to various embodiments, one or more top units 112 may be attached to the hand rail 108. A top unit 112 may include one or more communication interfaces 114 and/or one or more sensors 106. When located on the top unit 112, a sensor 106 may help to identify people, the contents of the cart, and/or aspects of the environment in which the cart is located.

According to various embodiments, the communication interface 114 may include a display screen, speaker, microphone, or other such communication elements. The communication interface 114 may be configured to receive input from a person. For example, the communication interface 114 may include a touch screen display. As another example, the communication interface 114 may be configured to detect hand gestures or other nonverbal communication. As yet another example, the communication interface 114 may be configured to detect voice commands.

In some embodiments, a display screen may be configured to rotate. For instance, the robotic cart may be configured to detect the presence of a human in an area proximate to the robotic cart. Then, the robotic cart may cause the display screen to rotate about one or more axes to face the human. Such an approach may allow the human to more easily view the contents of the display screen. In particular embodiments, the display screen may be updated to indicate to the human that the human has been detected. For instance, the display screen may be updated to display a face or a set of touch screen controls.

In some implementations, the communication interface 114 may be configured to communicate information to humans or other robots. For example, the communication interface 114 may be configured to communicate information related to the robotic cart's status or intended course of action. The intended course of action may include information such as a path that the robotic cart plans to traverse, an action related to the payload, or a sequence of tasks that the robotic cart plans to complete. The status may include information related to battery charge, mechanical performance, mobility system status, sensor operation, or other such data.

According to various embodiments, a robotic cart may include one or more hand rails. A hand rail 108 may include one or more handlebars 116. A handlebar may be configured to allow the cart to collect tactile information. For example, a handlebar 116 may be connected to one or more force torque sensor in a connecting joint 118 or a connecting joint 120. As another example, a handlebar 116 may be equipped with one or more rotational affordances that detect a rotational force applied by a human. As yet another example, a handlebar 116 may be equipped with one or more touch sensors, such as capacitive, resistive, or beam break touch sensors.

According to various embodiments, sensors associated with one or more handlebars may be configured to collectively capture various information. Such information may include, but is not limited to: whether a human has grasped the handlebar with one or two hands, an amount of force that the human is exerting on the handlebar, and a direction of force that the human is exerting on the handlebar. Such information may be transmitted to the central processing unit.

According to various embodiments, the central processing unit may be configured to employ the sensor information to perform a variety of tasks. In an autonomous state, the robotic cart may be configured to navigate an environment to perform a task such as transporting an object from one location to another. In a directed state, the robotic cart may be configured to receive physical input from a human via the handlebars to move in a direction indicated by the human. Other types of human-directed actions, such as the operation of a robotic arm, may also be performed.

In particular embodiments, different types of user input may provide for different types of operational responses. For example, when the robotic cart detects that a single human hand has been placed upon the handlebar, the robotic cart may halt and wait for further input. As another example, when the robotic cart detects that two human hands have been placed upon the handlebar, the robotic cart may enter an "ice cube" mode in which it employs the mobility apparatus to move in two dimensions over the floor in a direction determined based on the force torque sensors coupled with the handlebar. In this way, the human may easily move the robotic cart in a force-assisted manner.

In particular embodiments, one or more torque sensors (and/or force torque sensors) may be used. The detection of torque may be used to determine when to rotate the robotic cart. The robotic cart may be rotated relative to a point in the base component. For instance, the robotic cart may be rotated around an axis. Such a point may be the center of the base component or a different point. For instance, the point of rotation may be dynamically configuration.

In particular embodiments, one or more torque sensors (and/or force torque sensors) may detect a magnitude of rotational force. Then, the robotic cart may be rotated with a rotational rate (e.g., velocity, acceleration) consistent with the magnitude of the rotational force. As with other aspects of mobility, rotational movement may be accomplished by a control unit receive one or more messages from a sensor unit and then communicating with a mobility apparatus (which may include, for instance, four Mecanum wheels) to move the robotic cart in the designated translational and/or rotational direction.

According to various embodiments, the robotic cart may include one or more input sensors of various types (e.g., force, force torque, torque, directional) that collectively may sense a variety of physical user input. Such sensors may collectively provide information such as a direction of translational force, a velocity of translational force, a direction of rotational force, a velocity of rotational force, or some combination thereof.

According to various embodiments, a robotic cart may be configured in a manner different from that shown in FIG. 1. For example, a robotic cart may be configured as a pallet jack operable to lift and transport standard pallets that are either empty or holding various items. As another example, a robotic cart may be configured to transport a person standing on the robotic cart. As yet another example, a robotic cart may be configured to transport a specialized type of item, such as a standard 55-gallon drum.

Figure 2A:
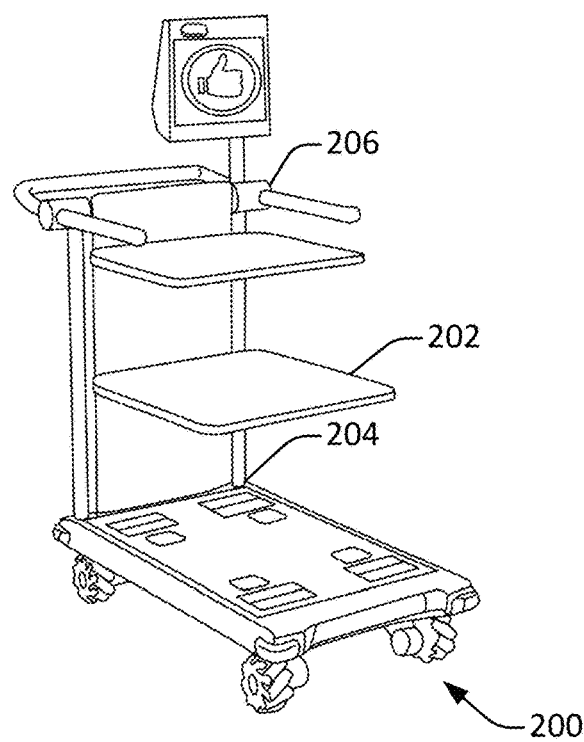
FIG. 2A, FIG. 2B, FIG. 2C, and FIG. 2D illustrate robotic carts, configured in accordance with one or more embodiments.
Figure 2B:
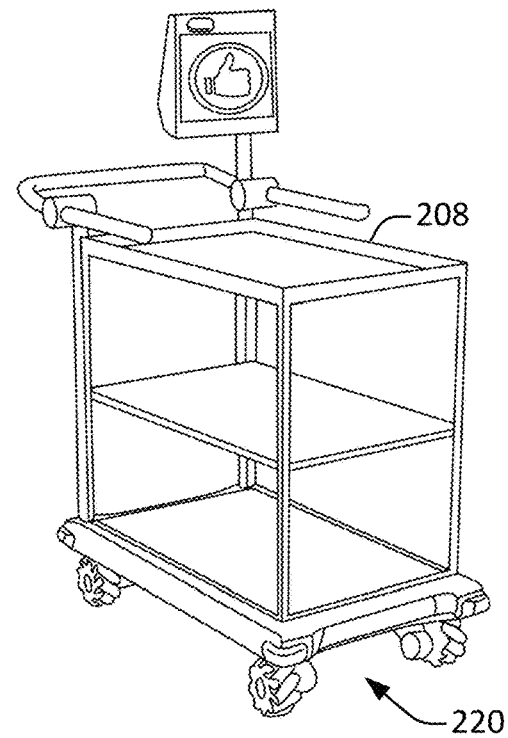

FIG. 2A, FIG. 2B, FIG. 2C, and FIG. 2D illustrate robotic carts, configured in accordance with one or more embodiments. In FIG. 2A, the robotic cart 200 is configured to include two half shelves 202 with attachment points 204 and 206 at the base of the cart near the hand rail apparatus and on the hand rail apparatus itself. In FIG. 2B, the robotic cart 220 is configured with two full shelves via a shelving unit 208 mounted to the base of the cart.

Figure 2C:
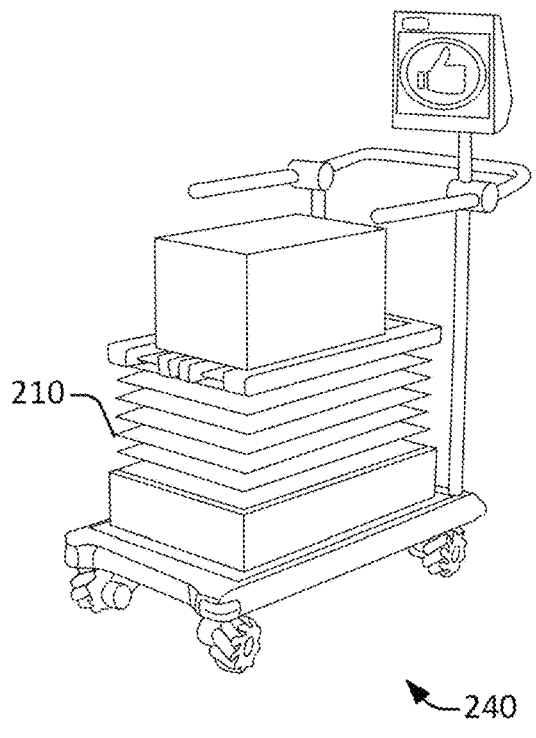
Figure 2D:
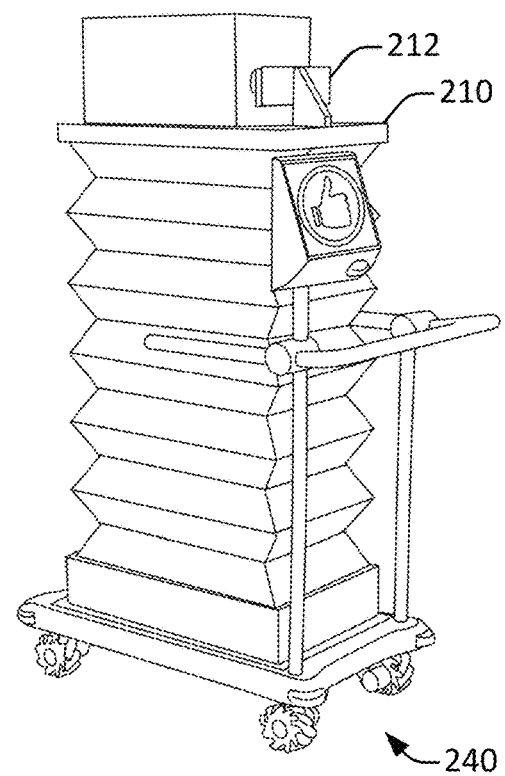

In FIG. 2C and FIG. 2D, the robotic cart 240 is shown configured with a scissor lift, in a collapsed position in FIG. 2C and an extended position in FIG. 2D. An object manipulation mechanism 212 includes one or more components for manipulating an object. Such components may include, but are not limited to: one or more conveyer belts, grabber arms, backstops, pushing devices, or suction devices.

Figure 3A:
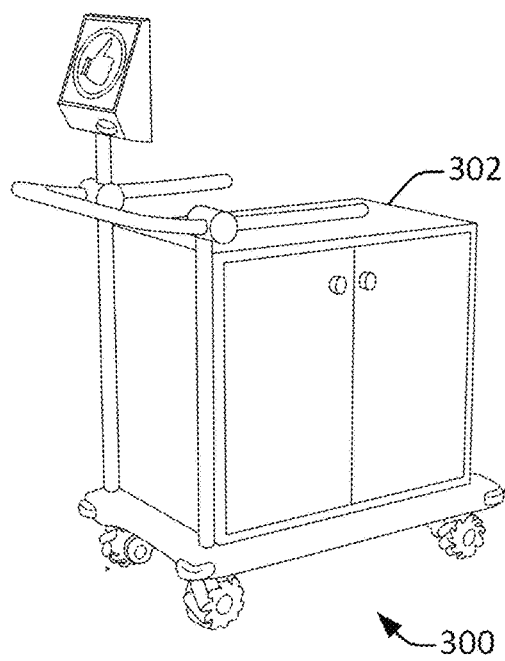
FIG. 3A, FIG. 3B, and FIG. 3C illustrate robotic carts, configured in accordance with one or more embodiments.
Figure 3B:
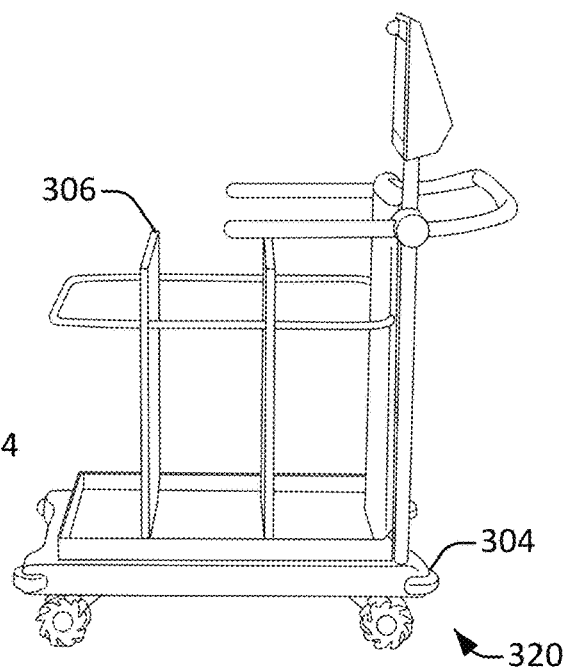
Figure 3C:
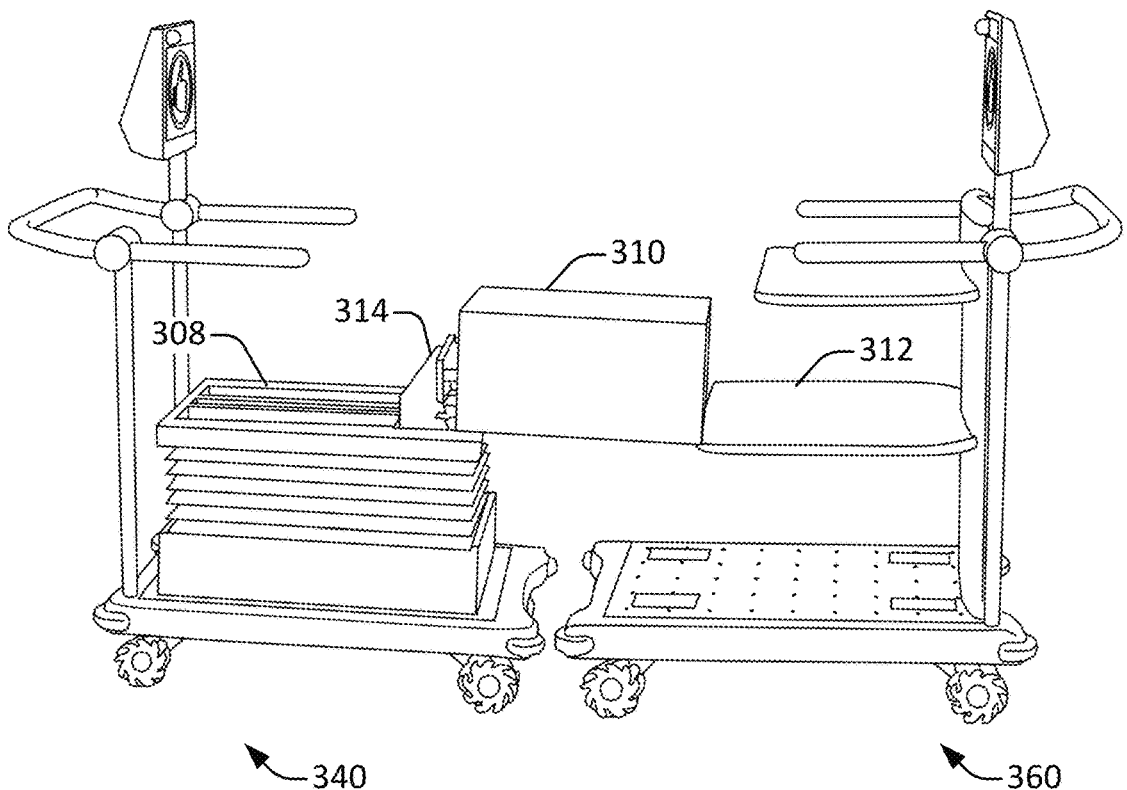

FIG. 3A, FIG. 3B, and FIG. 3C illustrate robotic carts, configured in accordance with one or more embodiments. In FIG. 3A, the robotic cart 300 is configured to include a cabinet 302 mounted on top of the cart base 304. In some implementations, the cabinet 302 may be configured with power to perform one or more operations. Such operations may include, but are not limited to: refrigeration, sterilization, and inventory tracking. The power and/or one or more instructions may be received from the robotic cart, for instance through connection points in the base. In FIG. 3B, the robotic cart 320 is configured with an organizational unit 306 mounted on the base 304.

In FIG. 3C, two robotic carts are shown cooperating to perform a task. The robotic cart 340 is equipped with a scissor lift 308 that includes a pushing mechanism 314. The scissor lift 308 and pushing mechanism 314 are used to transfer an item 310 onto the shelf of the robot 360.

Figure 4:
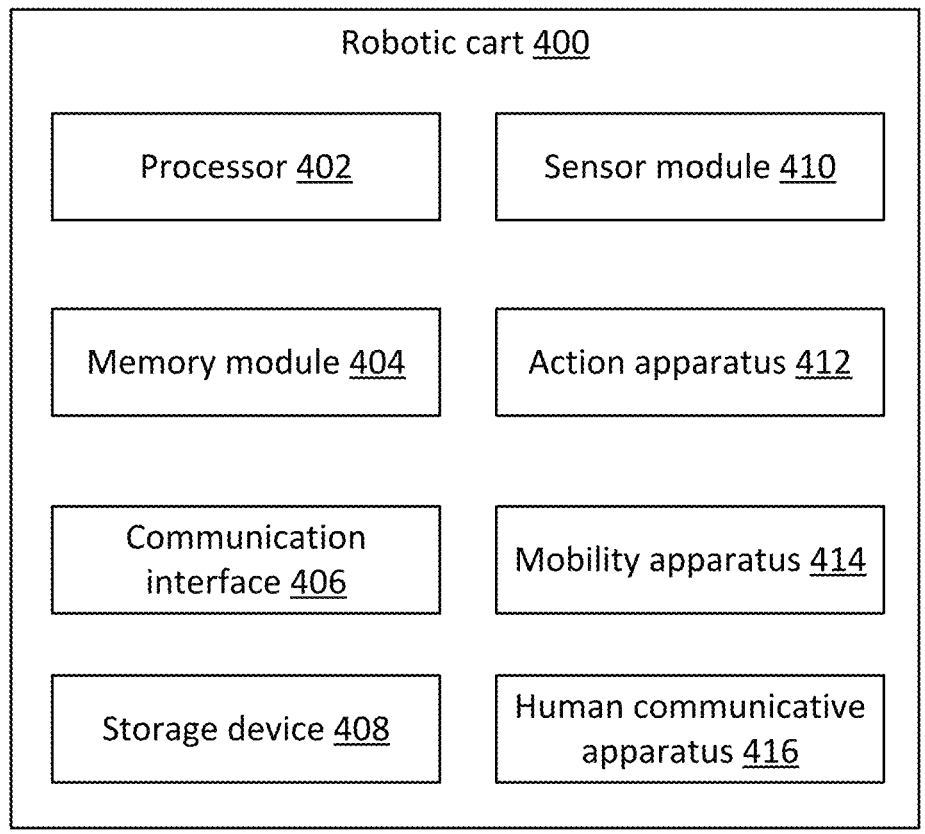
FIG. 4 illustrates an architecture diagram for a robotic cart, configured in accordance with one or more embodiments.

FIG. 4 illustrates an architecture diagram for a robotic cart 400, configured in accordance with one or more embodiments. According to various embodiments, the robotic cart 400 may be configured in a variety of form factors. The robotic cart 400 includes a processor 402, a memory module 404, a communication interface 406, a storage device 408, a sensor module 410, an action apparatus 412, a mobility apparatus 414, and a human communicative apparatus 416.

According to various embodiments, the robotic cart 400 may include one or more processors 402 configured to perform operations described herein. The memory module 404 may include one or more transitory memory elements, such as random access memory (RAM) modules. The storage device 408 may be configured to store information such as computer programming language instructions and/or configuration data.

In some implementations, the robotic cart 400 may include one or more communication interfaces 406 configured to perform wired and/or wireless communication. For example, the communication interface 406 may include a WiFi communication module. As another example, the communication interface 406 may include a wired port such as a universal serial bus (USB) port, which may be connected when the robot couples with a docking or charging port or device.

According to various embodiments, the sensor module 410 may include one or more of various types of sensors. Such sensors may include, but are not limited to: visual light cameras, infrared cameras, microphones, Lidar devices, Radar devices, chemical detection devices, near field communication devices, and accelerometers.

In particular embodiments, the sensor module 410 may communicate with one or more remote sensors. For example, an environment may be equipped with one or more of various types of sensors, data from which may be relayed to robots within the vicinity.

According to various embodiments, the action apparatus 412 may be any one or more devices or components used to perform a task. Such devices may include, but are not limited to: robotic arms, other types of manipulators, chemical applicators, light sources, suction devices, and sensors.

According to various embodiments, a device may be attached to the robotic cart 400 in any of various ways. For example, the device may be attached in a fixed orientation relative to a robot drive mechanism, for instance on the base of the robotic cart. As another example, the device may be attached to the robotic cart via a robotic arm having any of a variety of possible geometries, which in turn may be attached to the base or handlebars of the robotic cart.

According to various embodiments, the mobility apparatus may include one or more of any suitable mobility devices. Such devices may include, but are not limited to, one or more motorized wheels, balls, treads, or legs. In some configurations, the mobility apparatus may include one or more rotational and/or gyroscopic elements configured to aid in mobility and/or stability.

In particular embodiments, a mobility apparatus may include some number of Mecanum wheels. A Mecanum wheel is an omnidirectional wheel design for a vehicle to move in any direction. For instance, a Mecanum wheel may be implemented as a tireless wheel with a series of external rollers obliquely attached to the circumference of its rim. When different Mecanum wheels are configured as an independent non-steering drive wheels each with their own powertrain, spinning can generate a propelling force perpendicular to the roller axle, which can be vectored into a longitudinal and a transverse component in relation to the vehicle.

According to various embodiments, the robot may communicate directly with a human via the human communicative apparatus 416. The human communicative apparatus 416 may include one or more components for conducting visible and/or audible communication with a human. For instance, the human communicative apparatus 416 may include one or more display screens, LEDs, motors, robotic arms, motion sensors, speakers, microphones, or other such components. For example, the human communicative apparatus 416 may include a display screen coupled with a motor that may be used to provide visual cues about the robot's activities.

In particular embodiments, the robotic cart 400 may be configured to communicate directly or indirectly with other robots in order to accomplish its tasks. For example, robots may share information to build up an accurate model of an environment, identify the location and/or trajectory of humans, animals, objects, or perform social accommodation. As another example, robots may coordinate to execute a plan. For instance, one robot may be interrupted in a task due to social accommodation. The robot may then move on to another task, while a different robot may then later perform the interrupted task. As yet another example, robots may coordinate to perform a single task.

Figure 5:
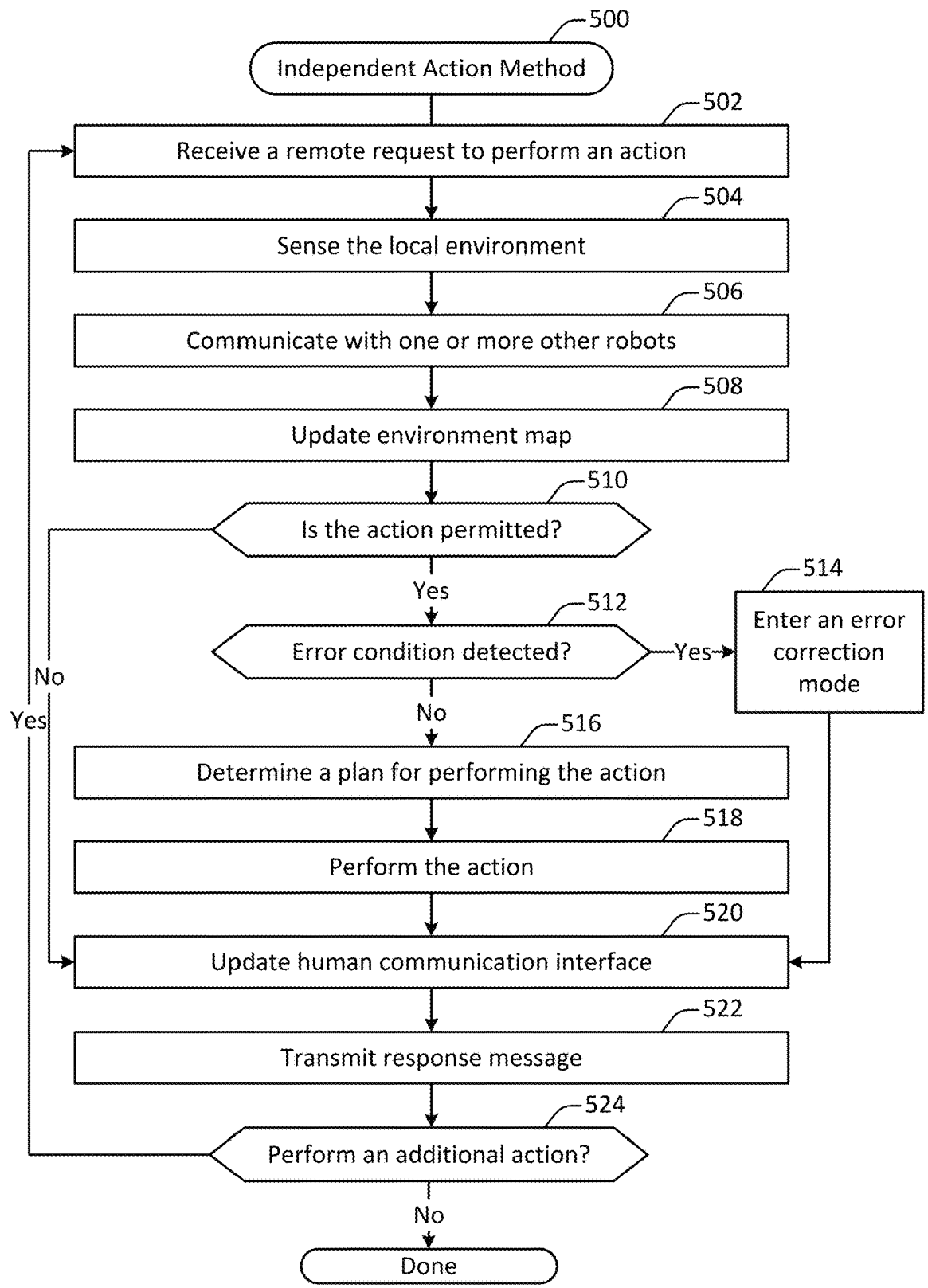
FIG. 5 illustrates a method for independent action by a robotic cart, performed in accordance with one or more embodiments.

FIG. 5 illustrates a method 500 for independent action, performed in accordance with one or more embodiments. The method 500 may be performed by a robotic cart and may facilitate the performance of an action by the robotic cart. Importantly, the operations shown in FIG. 5, and indeed in all methods described herein, may be performed in an order different than that shown. For example, operations may be performed in parallel, or in a different sequence. As another example, a robotic cart control unit may execute operations in an event-driven fashion, with the specific sequence depending on the situation. As yet another example, one or more operations may be omitted.

A request to perform an action is received at 502. According to various embodiments, the request may be received from a robotic cart fleet control unit. For example, a robotic cart fleet control unit may direct and/or coordinate activities across and among robotic carts within an environment such as a warehouse. For example, a robotic cart fleet control unit may transmit an instruction to the robotic cart to transport an item from a source location to a destination location within a warehouse. Alternatively, or additionally, a robotic cart may coordinate with other robotic carts, for instance in a peer-to-peer fashion, to assign and/or perform tasks.

The local environment is sensed at 504. According to various embodiments, sensing the local environment may involve receiving sensor data from one or more sensors at the robotic cart. For example, sensing the local environment may involve receiving information from optical sensors located on the robotic cart. However, as discussed herein, a variety of numbers and types of sensors may be used.

The robotic cart may communicate with other robots at 506. The other robots may include other instances of the robotic cart, other instances of robotic carts arranged in different configurations, other types of robots, or any type of remote computing device relevant to the processing performed in the method 500.

In particular embodiments, the communication performed at 506 may be performed in a local fashion. For instance, the robotic cart may communicate with one or more robots located within a designated radius of the robotic cart.

In some implementations, the communication performed at 506 may be used to receive additional environmental mapping information. For example, other robots may communicate information such as a state of the environment around those other robots. As another example, other robots may convey information such as sensor data received from one or more fixed sensors located within the environment.

In some implementations, the communication performed at 506 may be used to receive information about tasks and operations being performed or scheduled to be performed by the other robots. For example, another robot may convey information about a path through the environment along which the other robot plans to move. As another example, another robot may convey information about a particular task that the other robot is in the process of performing or plans to perform in the future. Such information may be used to assist the focal robot in its own task planning and performance, such as by avoiding a path that is predicted to intersect with a predicted path for a different robot.

An environment map is updated at 508. According to various embodiments, a robotic cart may maintain a map of its environment. The map may be created and/or updated based on information received from a robotic cart fleet control unit, from communication with other robots, and/or information received from sensors at the robotic cart. Updating the environment map may involve operations that may include, but are not limited to: updating locations for robots within an environment, updating locations of items within an environment, updating information about the environment itself, and/or updating information about blocked passages or other obstructions within the environment.

In some implementations, a robotic cart may receive a scene graph from a robotic cart fleet control unit at a designated interval, such as every 30 seconds. Similarly, the robotic cart may report to the robotic cart fleet control unit where the robotic cart estimates it is located within the scene graph at a designated interface, such as every 30 seconds.

A determination is made at 510 as to whether the action is permitted. Additional details related to determining whether the action is permitted are discussed with respect to the method 700 shown in FIG. 7.

A determination is made at 512 as to whether an error condition has been detected. According to various embodiments, any or all of a variety of error conditions may occur. Such conditions may include, but are not limited to: insufficient battery power to perform the requested action, a battery level below a designated threshold, a mechanical malfunction, a software error, and/or an environmental issue. For example, the robotic cart may determine that it has insufficient battery power to both perform a task and then subsequently return to a charging station. As another example, the robotic cart may determine that aspects of the environment or mechanical failure have caused the robotic cart to become stuck.

If an error condition has been detected, then an error correction mode is entered into at 514. According to various embodiments, entering into the error correction mode may involve transmitting a message indicating that the robot has encountered an error. For example, a message may be communicated to a robotic cart fleet control unit.

In some implementations, entering into the error correction mode may involve providing a local indicator of the error condition. For example, the robotic cart may update a display screen to display a red "thumbs down" or other type of error indication symbol or message. As another example, the robotic cart may display an audible warning, a flashing light, or perform another type of alert function.

In some embodiments, entering into the error correction mode may involve abandoning the task and instead taking an action to correct the error condition. For example, a low battery condition may be corrected by moving to a charging station. As another example, some types of mechanical errors may be corrected by moving to a repair station.

A plan for performing the action is determined at 516. According to various embodiments, determining the plan for performing the action may involve such operations as determining a path through an environment, determining a speed for moving along the path, and/or determining one or more instructions to provide to a payload having a mechanical capability.

In some embodiments, determining a plan of action may involve determining a route. The route may be determined based on various criteria, such as speed, distance, congestion, the current locations of humans and/or other robots, predicted future locations of humans and/or robots, or any other suitable information.

In some embodiments, determining a plan of action may involve determining a speed for moving along a route. For example, the robotic cart may move at a high rate of speed (e.g., 2 m/s) when no other humans or robots are present. However, the robotic cart may move at a lower rate of speed (e.g., 0.5 m/2) when humans are within a designated distance (e.g., 5 m) of the robotic cart.

In some embodiments, determining a plan of action may involve determining an instruction to send to a mechanical payload. For example, a mechanical arm, conveyer belt, scissor lift, or other apparatus may be instructed to perform an action such as picking an item from a shelf and placing it onto a payload area of the robotic cart, pushing an item off of a payload area of the robotic cart, raising or lowering an item in a vertical direction.

In particular embodiments, the plan of action may be periodically updated. For example, a robotic cart may determine that a human or another robot has blocked the planned path. At that point, the robotic cart may need to plan a different path and execute the new plan.

In particular embodiments, the plan of action may be determined based at least in part on the plans of action of other robots. For example, robotic carts may coordinate to ensure that they do not converge on the same intersection at the same time and while traveling at a high rate of speed.

If the action is permitted, then the action is performed at 518. According to various embodiments, performing the action may involve, for instance, moving the robot from one location to another along a determined path, moving an item onto or off of the robotic cart, performing an action with a mechanical payload such as a robotic arm or conveyer belt, and/or performing any other action or actions that the robotic cart is capable of performing. Thus, performing the action may involve transmitting an instruction to a mobility apparatus, a mechanical payload, a human communication interface, or any other element of the robotic cart.

A human communication interface is updated at 520. According to various embodiments, updating the human communication interface may involve presenting information indicative of the status, current actions, or future actions of the robotic cart. For example, a display screen may display a green "thumbs up" symbol if the robotic cart is functioning appropriately. As another example, a speaker may emit a beep that indicates the presence of the robotic cart and/or conveys information concerning the robotic cart.

A response message is transmitted at 522. According to various embodiments, the response message may be transmitted to a robotic cart fleet control unit. The response message may include information such as whether the action was permitted, whether an error condition has been detected, whether the action has been initiated, whether the action has been completed, a degree of progress in performing the action, and/or an amount of time estimated for performing the requested action.

A determination is made at 524 as to whether to perform an additional action. According to various embodiments, a robotic cart may continue to perform additional actions until a designated condition is met. Such conditions may include, but are not limited to: the receipt of an instruction to deactivate, the receipt of an instruction to travel to a charging station or other location, the detection of an error condition, and/or a determination that no additional actions are requested.

Figure 6:
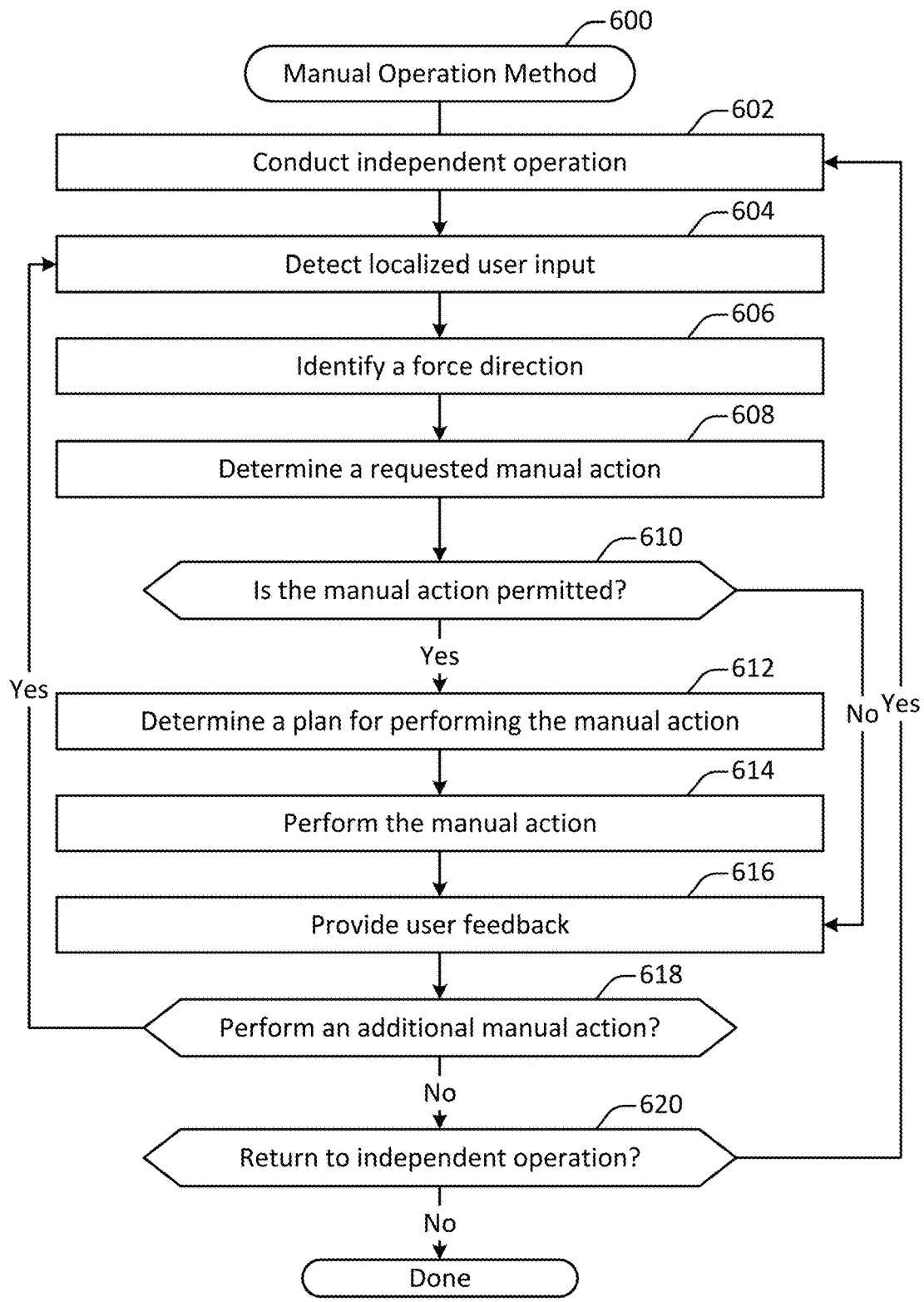
FIG. 6 illustrates a method for manual operation of a robotic cart, performed in accordance with one or more embodiments.

FIG. 6 illustrates a method 600 for manual operation of a robotic cart, performed in accordance with one or more embodiments. The method 600 may be performed to facilitate the interruption of a robotic cart's independent operation based on input received from a human.

The robot conducts independent operation at 602. According to various embodiments, conducting independent operation may be performed as described with respect to the method 500 shown in FIG. 5.

Localized input is detected at 604. According to various embodiments, localized input may be detected in any of various ways. For example, one or more sensors, such as pressure sensors or capacitive touch sensors, may detect that one or more human hands has touched a handlebar on the robotic cart. As another example, a human may provide input via an app on a mobile phone, a remote control device, voice command, or gesture indicating that the human would like to take manual control of the robotic cart. As yet another example, a robotic cart fleet control unit may send an instruction to place the robotic cart in manual operation mode. As still another example, a camera or other sensor may detect the presence of a human proximate to the robotic cart and place the robotic cart into a manual operation mode based on that presence.

A force direction is identified at 606. In some implementations, the force direction may be identified based on user input. For example, the robotic cart may include a handlebar connected to a sensor (e.g., a force torque sensor) configured to determine a direction of force exerted on the sensor. As another example, the robotic cart may receive input from an app on a mobile phone. As yet another example, the robotic cart may receive input from a directional button or joystick physically or communicably coupled with the robotic cart.

In particular embodiments, an amount of force may be identified in addition to a direction of force. An amount of force may be identified by a sensor (e.g., a force sensor, a force torque sensor, a torque sensor) or other mechanism. For example, a sensor may sense force magnitude, torque magnitude, or other types of force. For example, a person may push a robotic cart harder to indicate that more force is desired. As another example, a person may depress a mechanical arm or lever to indicate a desired amount of force. The amount of force may correspond with, for instance, a desired degree of speed, acceleration, and/or distance for moving the robotic cart.

A requested manual action is determined at 608. According to various embodiments, the requested manual action may involve movement in a designated direction at a particular speed and/or acceleration. Alternatively, or additionally, the requested manual action may involve operation of a mechanical device coupled with the robotic cart, such as a robotic arm, a conveyer belt, or a scissor lift.

In some implementations, the requested manual action may be determined at least in part based on the force direction received at 606, the localized user input received at 604, communication with a remote computing device, and/or one or more parameters or settings. For example, the robotic cart may determine that the user has provided input requesting that the robotic cart move in a particular direction at maximum speed. The robotic cart may then determine that the maximum speed for manual operation is 0.5 meters per second. As another example, the robotic cart may determine that the user has provided input requesting that the robotic cart lift an item in a vertical direction via a scissor lift.

A determination is made at 610 as to whether the manual action is permitted. Additional details regarding the determination as to whether an action is permitted are discussed with respect to the method 700 shown in FIG. 7.

A plan for performing the action is determined at 612. According to various embodiments, determining the plan for performing the action may involve such operations as determining a path through an environment, determining a speed for moving along the path, and/or determining one or more instructions to provide to a payload having a mechanical capability.

In some embodiments, determining a plan of action may involve determining an instruction to send to a mechanical payload. For example, a mechanical arm, conveyer belt, scissor lift, or other apparatus may be instructed to perform an action such as picking an item from a shelf and placing it onto a payload area of the robotic cart, pushing an item off of a payload area of the robotic cart, raising or lowering an item in a vertical direction.

In some embodiments, determining a plan of action may involve determining whether a requested manual action needs to be modified. For example, if a human provides input indicating that the robotic cart is to move in a particular direction at a high rate of speed, and the robotic cart determines that such an action would be not permitted (as discussed with respect to FIG. 7), then the robotic cart may determine a different plan of action. For instance, the robotic cart may determine a plan that involves moving in a different (e.g., similar) direction or a different (e.g., lower) rate of speed than the action requested. In this way, the robotic cart may comply with the human's request while avoiding such pitfalls as stairs, ledges, bumps, or holes, and while avoiding creating conditions that are unsafe for humans, animals, objects, or other robots.

If the action is permitted, then the action is performed at 614. According to various embodiments, performing the action may involve, for instance, moving the robot from one location to another along a determined path, moving an item onto or off of the robotic cart, performing an action with a mechanical payload such as a robotic arm or conveyer belt, and/or performing any other action or actions that the robotic cart is capable of performing. Thus, performing the action may involve transmitting an instruction to a mobility apparatus, a mechanical payload, a human communication interface, or any other element of the robotic cart.

User feedback is provided at 616. According to various embodiments, updating the human communication interface may involve presenting information indicative of the status, current actions, or future actions of the robotic cart. For example, a display screen may display a green "thumbs up" symbol if the robotic cart is functioning appropriately, and a red "thumbs down" symbol if a manual action has been requested that is not permitted. As another example, a speaker may emit a beep that indicates the presence of the robotic cart and/or conveys information concerning the robotic cart. As yet another example, the robotic cart may provide haptic feedback, for instance by causing a handlebar to rumble when a requested course of action is not permitted or needs to be modified.

A determination is made at 618 as to whether to perform an additional manual action. According to various embodiments, the determination may be made based on user feedback. For instance, the robotic cart may remain in manual operation mode until one or more designated conditions are met. Leaving manual operation mode may involve the detection of conditions such as the human's hands leaving the robotic cart's handlebars for a designated period of time, the human moving away from the robotic cart by a designated distance, and/or the human provide manual user input such as by pressing a button indicating that manual action has ceased.

In particular embodiments, FIG. 6 may include additional operations not shown in FIG. 6. For example, as discussed with respect to FIG. 5, the robotic cart may periodically receive a scene graph from a robotic cart fleet control system. Similarly, the robotic cart may periodically transmit information to the robotic cart fleet control system, such as the robotic cart's status and/or estimated location. As another example, the robotic cart may perform operations such as sensing the external environment, communicating with other carts, updating its environment map, etc. Such operations may be useful for determining whether the manual action is permitted at 610, determining a plan of action for performing the manual action at 612, and performing the manual action at 614.

A determination is made at 620 as to whether to return the robotic cart to independent operation. In some implementations, the robotic cart may immediately return to independent operation when additional manual actions are not performed. Alternatively, or additionally, the robotic cart may return to independent operation when one or more conditions is met. For example, the robotic cart may return to independent operation when manual action has not been requested within a designated period of time. As another example, the robotic cart may return to manual operation based on its location. For instance, if it has been moved to a designated area of the environment, such as a dead zone, then it may remain in manual mode until it is moved again or specifically instructed to resume independent operation. As yet another example, the robotic cart may remain in manual operation mode until it receives a new task from the robotic cart fleet control system.

Figure 7:
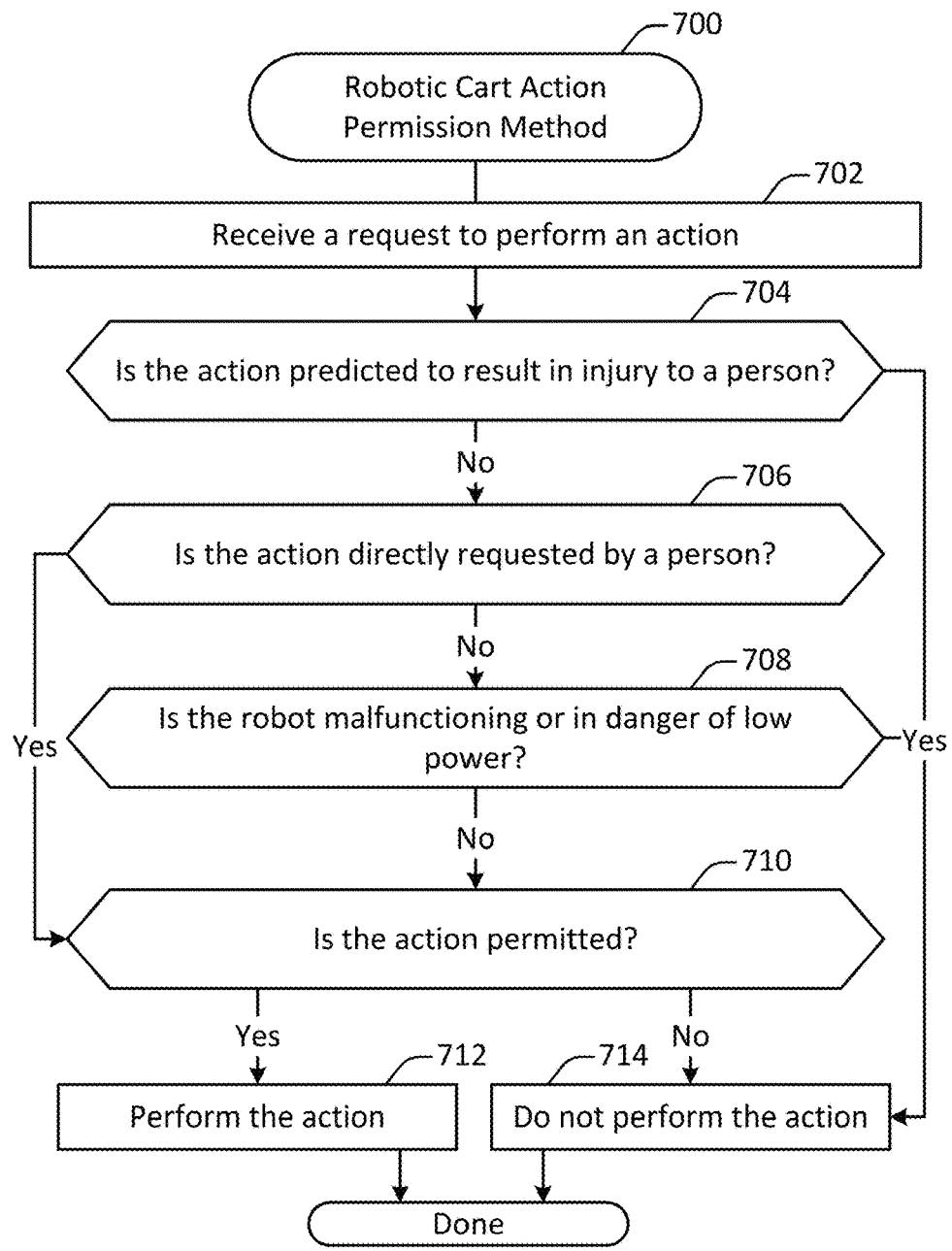
FIG. 7 illustrates a robotic cart action permission method, performed in accordance with one or more embodiments.

FIG. 7 illustrates a robotic cart action permission method 700, performed in accordance with one or more embodiments. The method 700 may be performed in conjunction with another method, such as the methods 500 and 600 shown in FIGS. 5 and 6, to determine whether a robotic cart is permitted to perform a manual or independent action in the present circumstances in which the robotic cart finds itself.

A request to perform an action is received at 702. In some implementations, the request may be generated as described with respect to operation 510 shown in FIG. 5 or operation 610 shown in FIG. 6.

A determination is made at 704 as to whether the action is predicted to result in injury to a person. According to various embodiments, the determination may be made by identifying, as discussed with respect to FIGS. 5 and 6, the location of any nearby humans. Then, the robotic cart may determine whether the requested action is likely to cause the robotic cart to collide with the human. Other types of actions may also be predicted to result in injury to a person. For example, moving an object with a mechanical arm in a manner predicted to cause the arm or the object to collide with the human may be treated in a similar fashion.

In particular embodiments, the determination at 704 may be extended to determine whether the requested action is predicted to result in damage to something other than a person. For instance, injury to an animal and/or damage to objects or other robots within the environment may also be predicted and avoided.

A determination is made at 706 as to whether the action is directly requested by a person. According to various embodiments, the action may be directly requested by a person as discussed with respect to the method 600 shown in FIG. 6. Alternatively, the action may be determined by the robot in an independent fashion, as discussed with respect to the method 700 shown in FIG. 7.

If the action is not directly requested by a person, then at 708 a determination is made as to whether the robot is malfunctioning or in danger of lower power. As discussed with respect to, for example, the error condition detected at operation 512, such a situation may cause the robotic cart to enter an error correction mode in which it either deactivates or takes one or more actions to correct the error, such as returning to a charging station. In such a condition, the robot may present an indication of the error condition (e.g., a red "thumbs down" on a display screen, a particular beep, a flashing light, etc.).

A determination is made at 710 as to whether the action is permitted. According to various embodiments, some actions may violate one or more rules associated with a specific environment or robotic carts in general. For example, a robotic cart may be configured to never fall off a cliff or down stairs. As another example, a robotic cart may be configured to avoid bumps and holes in the floor. As yet another example, a robotic cart may be configured to avoid designated locations within an environment, such as areas with other mechanical equipment present. In some implementations, operation 710 may be performed for actions requested by a human. Alternatively, operation 710 may be limited to independent actions not requested by a human.

If injury or damage is predicted, or if the robot is malfunctioning or in danger of low power, or if the action is otherwise impermissible, then the action is not performed at 714. Otherwise, the action is performed at 712. Not performing the action may involve transmitting an error message. Such a message may be sent to a remote computing device. Alternatively, or additionally, the robotic cart may present a message or other indication of an error condition in some other fashion. For example, the robotic cart may vibrate, slow down, stop, beep, flash a light, and/or update an indication on a display screen if a person requests in manual operation mode the performance of an action that is not permitted. As another example, the robotic cart may enter an error condition, as discussed with respect to the methods 500 and 600 shown in FIG. 6.

Figure 8:
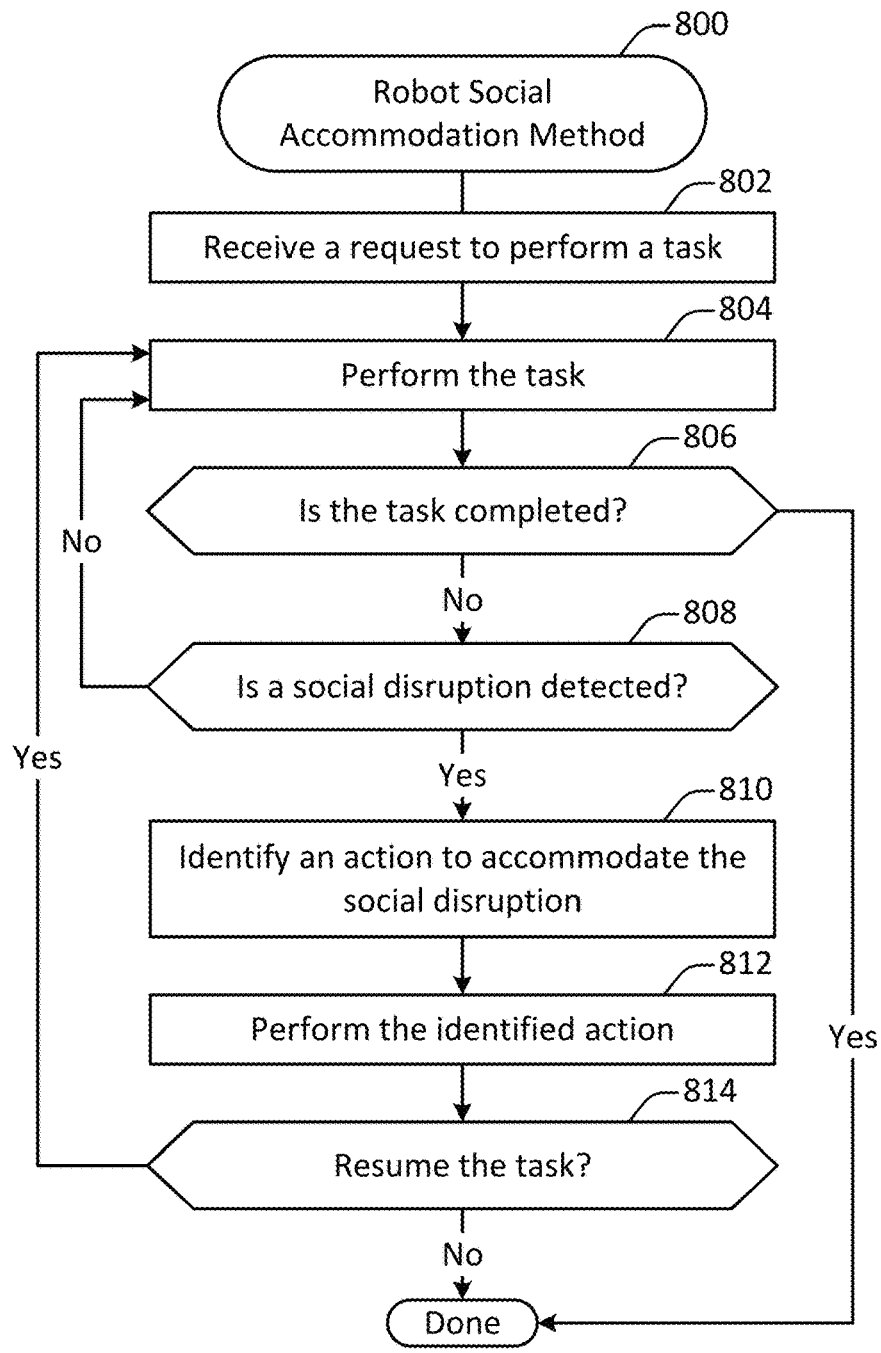
FIG. 8 illustrates a method for social accommodation by a robot, performed in accordance with one or more embodiments.

FIG. 8 illustrates a method 800 for social accommodation by a robot, performed in accordance with one or more embodiments. The method 800 may be performed by the robot as part of, or in addition to, the execution of any other operations.

A request to perform a task is received at 802. According to various embodiments, the task may include any operation capable of being performed by the robot. For example, the task may include transporting one or more objects, waiting at a designated location, or any of the actions discussed with respect to operation 810 as being performed to accommodate a social disruption.

The task is performed at 804. A determination is made at 806 as to whether the task is completed. If the task is completed, then the method is finished. If the task is not completed, then a determination is made at 808 as to whether a social disruption is detected. An action to accommodate the social disruption is identified at 810, and the action is performed at 812. A determination is made at 814 as to whether to resume the task. Depending on the outcome of that determination, the task is resumed at 804 or the method is terminated. When the method is terminated, the robot may move on to the next task.

According to various embodiments, the detection of a response to social disruption may be pre-configured and/or dynamically determined based on a variety of characteristics such as the environment in which the robot is operating, the identity or role of a human associated with the social disruption, the urgency of the robot's tasks, instructions received from a human, and/or one or more safety considerations.

Although a variety of specific examples are discussed herein, various configurations are possible. For example, some embodiments discussed herein refer to a robot configured to transport objects. However, a robot may response to social disruption when performing any of a variety of tasks.

In some implementations, a robot may be interrupted while transporting one or more objects by a person walking near the robot. In such a situation, the robot may predict that the human is likely to intersect with the robot's original path. Accordingly, the robot may alter its path and move out of the way. After the human departs, the robot may resume its task.

In some implementations, when a task is interrupted, the robot may wait either passively or actively. If passively waiting to resume a task, the robot may select a spot off to the side from the predicted paths along which people are most likely to walk. If actively waiting to resume a task, the robot may select another task to perform. For example, if interrupted while retrieving one object, the robot may retrieve a different object while it waits to resume retrieving the first object.

In some implementations, a social disruption may constitute the actual movement of a human into close proximity with the robot. Alternatively, or additionally, a social disruption may constitute the predicted movement of a human into close proximity with the robot. For instance, a robot engaged in a task may sense its environment and predict that a human is moving along a path that will bring the human in close proximity to the robot. If so, the robot may treat the human's movement as a social disruption even though the human is not yet actually located proximate to the robot.

In some implementations, a robot may determine whether or not to wait and resume a task or move on to another task based on, for instance, predicted human activity. For example, the robot may predict that a human is likely to enter and quickly leave an area based on the human's movement along a path. In such a situation, the robot may elect to wait for the human to pass and then resume the task. As another example, the robot may predict that a social disruption is likely to be long-lasting, such as when a human is rearranging items in an area of a warehouse. In such a situation, the robot may elect to move on to a different task.

According to various embodiments, the robot may strategically determine whether to employ active or passive waiting based on factors such as whether the area is crowded with people, the time required to switch between tasks, the time scheduled in which to complete one or more tasks, and/or instructions from humans.

According to various embodiments, as part of responding to a social disruption or at any other time, a robot may provide any of a variety of social cues. Examples of such cues may include, but are not limited to: lights, sounds, vibration, and movement. For example, a robot may activate one or more lights and/or emit one or more sounds when transport is initiated. As another example, the robot may activate a spinning mechanical component to provide a visual indicator associated with transport.

In particular embodiments, the robot may employ a human communicative apparatus to execute complex human interactions. For example, a robot may be equipped with a display screen that is coupled with one or more motors.

When the robot is actively engaged in a task such as transporting one or more objects, the display screen may display a simulated face. The motors may be activated to position the display screen so that the face appears to be looking toward the direction in which the robot plans to travel, so as to provide a visual cue about the robot's future direction. When a human approaches the robot, the robot may take one or more steps to respond. For example, the robot may disable the face to show that the robot has stopped. As another example, the robot may reposition the display screen so that the simulated face appears to gaze at the human, which provides a visual cue that the robot is aware of the human's presence. As yet another example, the robot may change the appearance of the display screen, for instance by, presenting a warning symbol and/or message and/or changing the facial expression displayed on the simulated face. When the human moves away from the robot, the robot may then return the display screen and other components of the human communicative apparatus to the previous state.

In particular embodiments, a robot may emit a visual social cue indicating how long a task will take. For example, a robot may be equipped with a visible screen that is configured to display one or more countdown clocks. A countdown clock may indicate a time remaining for transporting one or more objects. Alternately, or additionally, a countdown clock may indicate a time remaining before a robot needs to recharge. As another example, a robot may be equipped with one or more colored lights to indicate the degree of completion of a task. For instance, presenting a visual cue may involve changing the color of an LED strip. Such an LED strip may be located, for instance, at 122 in a recessed area on the edge of or underneath the base component 102. The visual social cue may be perceivable from a distance so that a human can decide whether to interrupt the robot.

In some embodiments, presenting a visual cue may involve emitting audio. For example, one or more sound effects may be emitted when people transition across virtual boundaries. As another example, audio communication may be emitted in the form of music. As yet another example, audio communication may be emitted in the form of spoken natural language, for instance via text to speech or voice recording. Natural language communication may be presented on a display screen, or through speech, or a combination thereof. As still another example, the robot may emit a tune or whistle to indicate its progression in a task. As still another example, the robot may be configured to emit a verbal countdown or other natural language descriptions of progress along a task. For instance, the robot may state a task and verbally identify the initiation and/or completion of a task.

In some embodiments, presenting a visual cue may involve an information screen configured to display information such as text or icons. For instance, a caution icon may be displayed.

In some embodiments, presenting a visual cue may involve a projector to display information similarly to screen displays. Alternatively, or additionally, a projector may present a visual cue through illumination based on color and/or brightness similarly to LED strips. A projector may be used to show a graphic and/or text on the ground, for instance to indicate a safe boundary for humans to stay away, or onto a surface, for instance to display augmented reality information such as future direction of the robot or objects planned for future interaction or manipulation.

In some embodiments, a display screen on the robot may display an emotionally expressive face that is used for indicating system states. For example, when people are detected, the robot may present a happy face. As another example, when people are engaged in interaction for communicating with the robot, the robot may present a face that reflects the situation or statement (e.g., happy, apologetic, or thankful). As yet another example, when the robot predicts that people may soon be in an unsafe location, the robot may display a face indicating shock or panic.

In some embodiments, presenting a visual cue may involve motion. For example, the robot may use its arm for communicative gestures such as pointing to objects or surfaces for confirmation or socially communicating with people, for instance by waving. As another example, the robot may have the ability to move a "head" area (e.g., with 1-3 degrees of freedom) on which a display screen is mounted to control head gaze for communicating with people and directing sensors. Head gaze direction may be used to communicate task state (e.g., navigational goals, object/surface targets for disinfection) or interaction state (e.g., people being interacted with). Neck motions may also be used as communicative gestures, such as shaking the head no. As yet another example, the robot may use a mobile base trajectory for communication, for instance by driving to encircle a region to refer to it for task confirmation. As still another example, any of the robot's movable components may be used for emphasis within a communicative message, for instance for beat gestures.

In particular embodiments, the method 800 may include one or more operations not shown in FIG. 8. For example, the robot may log or report a social disruption, an action performed in response to the social disruption, and/or the robot's success or failure at performing the requested task.

Figure 9:
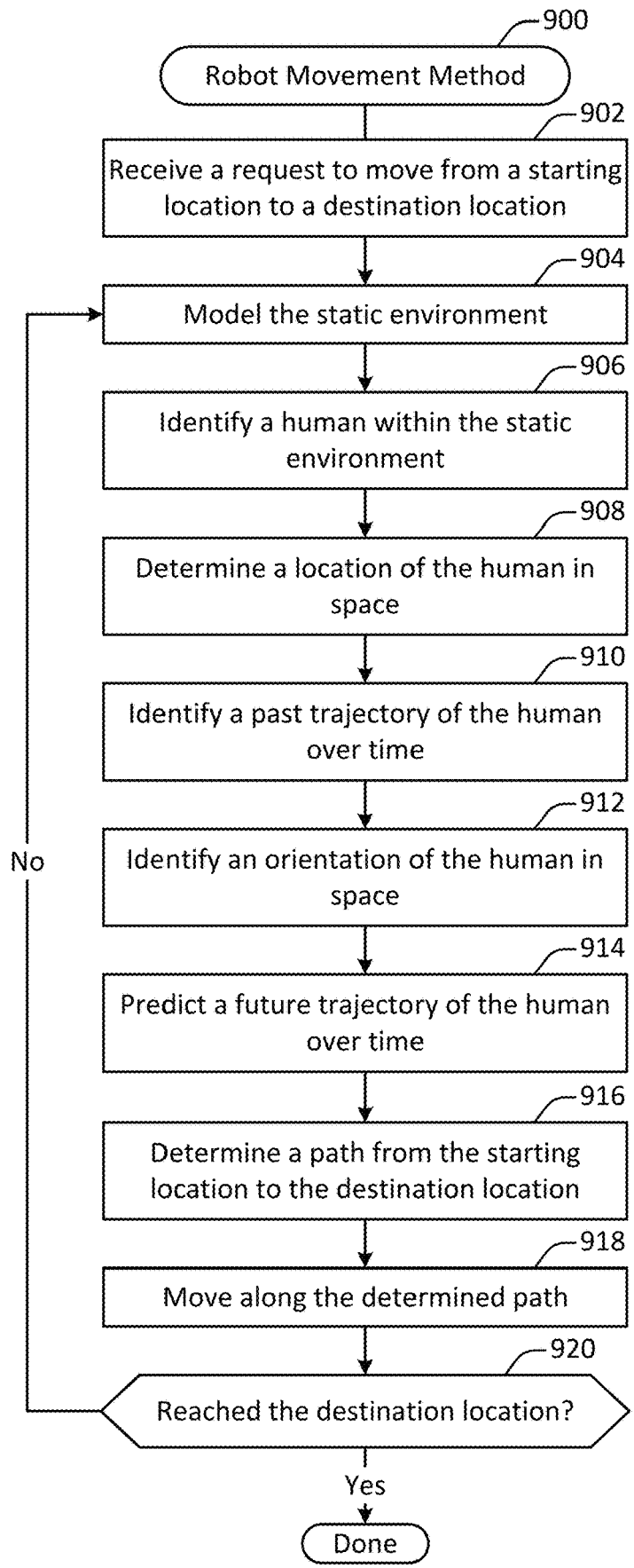
FIG. 9 illustrates a method for moving a robot, performed in accordance with one or more embodiments.

FIG. 9 illustrates a method 900 for moving a robot, performed in accordance with one or more embodiments. The method 900 may be performed in order to position the robot for performing a task. Alternatively, or additionally, the method 900 may be performed to move the robot to a location where it does not interfere with human activity. As still another example, the method 900 may be performed while the robot is performing a task, such as monitoring an area.

A request to move from a starting location to a destination location is received at 902. According to various embodiments, the destination location may be determined based on any of a variety of considerations. For example, the robot may receive an instruction to move to a designated location. As another example, the robot may determine the location based on a task or set of tasks that the robot is attempting to perform.

The static environment is modeled at 904. In some implementations, the static environment may be modeled based on sensor data received from one or more of a visible light camera, an infrared camera, a depth sensor, radar, lidar, or any other suitable sensor. The model of the static environment may indicate features such as walls and/or fixed objects such as tables.

In some embodiments, a single sensor may include more than one type of functionality. For instance, a camera may detect both visible and infrared light. In particular embodiments, a robotic cart may include an infrared light source for spreading light that may then be detected by an infrared camera.

In particular embodiments, information about the static environment may be predetermined. For instance, a robot may be provided with a two-dimensional or three-dimensional map of an environment.

In particular embodiments, information about the static environment may be received from a remote data source. For example, one or more sensors in an environment, such as sensors located on another robot, may collect information about the environment. Such information may then be transmitted to the robot, which may use the information to replace or supplement locally collected information.

A human within the static environment is identified at 906. The human may be identified by performing object recognition, for instance via pre-trained neural networks, on the sensor data. For simplicity, FIG. 9 is described as planning robotic movement in an environment with a single human. However, such operations may be applied more generally to environments with one or more humans, robots, machines, vehicles, animals, other animate objects, or some combination thereof.

In some embodiments, a human may be identified at least in part by scanning an environment with a sensor having limited capabilities. For example, visual light, radar, or lidar sensors may be used to detect objects that may or may not be humans. As another example, a laser may scan the room, for instance at a few inches from the ground to identify objects that may or may not be humans. Such sensors may provide limited information, such as a distance from the robot to an object in a particular direction. However, a pattern in the distance in a particular direction may be recognized as potentially indicating the presence of a human.

In some implementations, an object identified as a candidate by a sensor having limited capabilities, such as a two-dimensional laser depth sensor, may then be subjected to a more comprehensive analysis, such as one or more cameras. For instance, one or more sensors such as cameras may be used to capture monocular visual data, binocular visual data, or other visual data of the object. Such cameras may be equipped with sophisticated features such as pan and tilt, which may be used to focus on an object identified by the less sophisticated sensors. Then, an object recognition procedure may be used on the captured data to confirm whether the object is a person and to determine various information about the person, such as the person's role or identity.

In particular embodiments, a sensor may combine active depth and passive optical sensing capabilities. For example, a camera may include a projected structured infrared light component that projects a pattern of infrared light onto the surroundings, which may be used to determine distance from the camera to the objects. As another example, a camera may include depth detection based on time-of-flight of projected infrared light. In either case, the same camera may also detect visible light.

In particular embodiments, once an object is identified as a person, the person may be subject to more refined identification in which the person is identified. For instance, a human may be classified based on age, size, a number of times that the human previously has been observed, or any other characteristics. For instance, a human may be classified at least in part based on a badge, clothing such as a uniform, or other visual indicators of the human's role in the workplace. The human may then be treated differently based on the human's past interactions with the robot. For example, a human who has never been observed may be given a relatively wide berth because the robot may be unfamiliar to the human. As another example, a child may be given a relatively wide berth. As another example, a human who is identified as having been near the robot many times in the past may be given a relatively narrow berth since the robot is likely familiar to the human.

A location of the human in space is determined at 908. In some implementations, the human may be positioned in a virtual two-dimensional or three-dimensional map of the environment. The human may be located in space by using information captured by one or more depth sensors, optical sensors, laser sensors, lidar sensors, and/or other sensors. Positioning the human in space may allow the robot to reason about the human, for instance for the purpose of trajectory mapping and/or route planning.

A past trajectory of the human over time is identified at 910. According to various embodiments, the past trajectory of the human over time may be identified by analyzing historical sensor data. For example, data from a two-dimensional laser scanner over time may be used to plot the location of the human over time in the virtual two-dimensional or three-dimensional map of the environment. As another example, video data from one or more cameras may be used for tracking people or objects.

An orientation of the human in space is determined at 912. In some implementations, the orientation may characterize the position of the human as standing, sitting, kneeling, or arranged in some other position. Alternatively, or additionally, the orientation may characterize the position of the human as facing in a particular direction relative to the environment.

In particular embodiments, the orientation may be determined based at least in part on the past trajectory of the human. For example, if the human is moving along a trajectory, the human may be presumed to be facing in the direction of the trajectory.

In particular embodiments, the orientation may be determined based at least in part on other physical objects. For example, if the human is sitting in a chair, the orientation may be determined at least in part by the position of the chair.

Movement of the identified humans within the static environment is predicted at 914. According to various embodiments, movement of humans may be predicted via heuristics. For example, if a person opens a door, the person is likely to move through the door in the near future. As another example, when a small group of people are positioned near one another and talking intensely, they are likely to continue talking unless one of the principals has intimated through gesture, spoken words, or body motion that they are leaving. As yet another example, when a person makes a gesture such as a "come through" wave, the robot may predict that the person is waiting for the robot to move. In such a situation, the robot may proceed and may make a social acknowledgement of the person's action. Such a social acknowledgement may include a message on a screen, a light, a spoken message, or another audible notification.

In some implementations, movement of humans may be predicted via past actions. For example, the robot may have observed in the past that a particular human tends to follow a particular path through a space. As another example, the robot may identify a person's likely trajectory based on the person's role. For instance, the robot may expect a maintenance worker to enter a particular door, which may never be entered by members of the public.

A path from the starting location to the destination location is determined at 916. The robot moves along the determined path at 918. According to various embodiments, the robot may give a wide berth to people whenever possible, based on the predicted path of each person. For example, the robot may determine a path to the destination that minimizes travel time while at the same time staying at least 6 feet from each person when in an open area. In a more closed area such as a hallway in which less room is available, the robot may plan the path so as to stay as far from each person as possible. In general, the robot may plan a path in such a way as to avoid requiring humans to alter their activities to accommodate the robot. The robot may alter both its path and its speed in order to enforce this distancing.

In particular embodiments, the robot may alter its path based on the identity of the person. For example, the robot may determine a path that places it relatively further from people who it has not encountered before, even if such a path is longer than necessary. Such people are unknown to the robot, and the robot may be unknown to such people, rendering the actions of such people less predictable than people who have interacted with the robot before. As another example, the robot may determine a path that places it relatively further from small children or animals even if such a path is longer than necessary since animals and small children may be inherently unpredictable. As yet another example, the robot may determine a path that places it relatively further from humans whose behavior the robot cannot accurately predict. Such people may include, for instance, maintenance workers moving rapidly between surfaces in a space, doctors moving from patient to patient in a hospital setting, or children playing.

A determination is made at 920 as to whether the destination location has been reached. If not, the routine may continue until the destination is reached. That is, the robot may continue to model the environment and the location of people to execute the movement in a socially appropriate manner.

According to various embodiments, the techniques described in FIG. 9 may be used to move the robot relative to any or all of a variety of obstacles. For example, although the method 900 is described with respect to moving a robot to a destination when a single human is present, the techniques may be applied to environments in which any number of humans are present. As another example, the method 900 may be applied to move the robot to a destination in which an environment includes one or more animals.

In some implementations, the method 900 may be applied to move the robot to a destination in which an environment includes one or more movable inanimate objects, such as other robots. The movement of objects that are not self-directed may be predicted via a physics-based simulation. For example, a ball that is bouncing or rolling down a hill may be predicted to continue bouncing or rolling down a hill. The movement of robots may be predicted at least in part based on communication with those robots. Alternatively, or additionally, robots may be modeled in a manner similar to humans.

Figure 10:
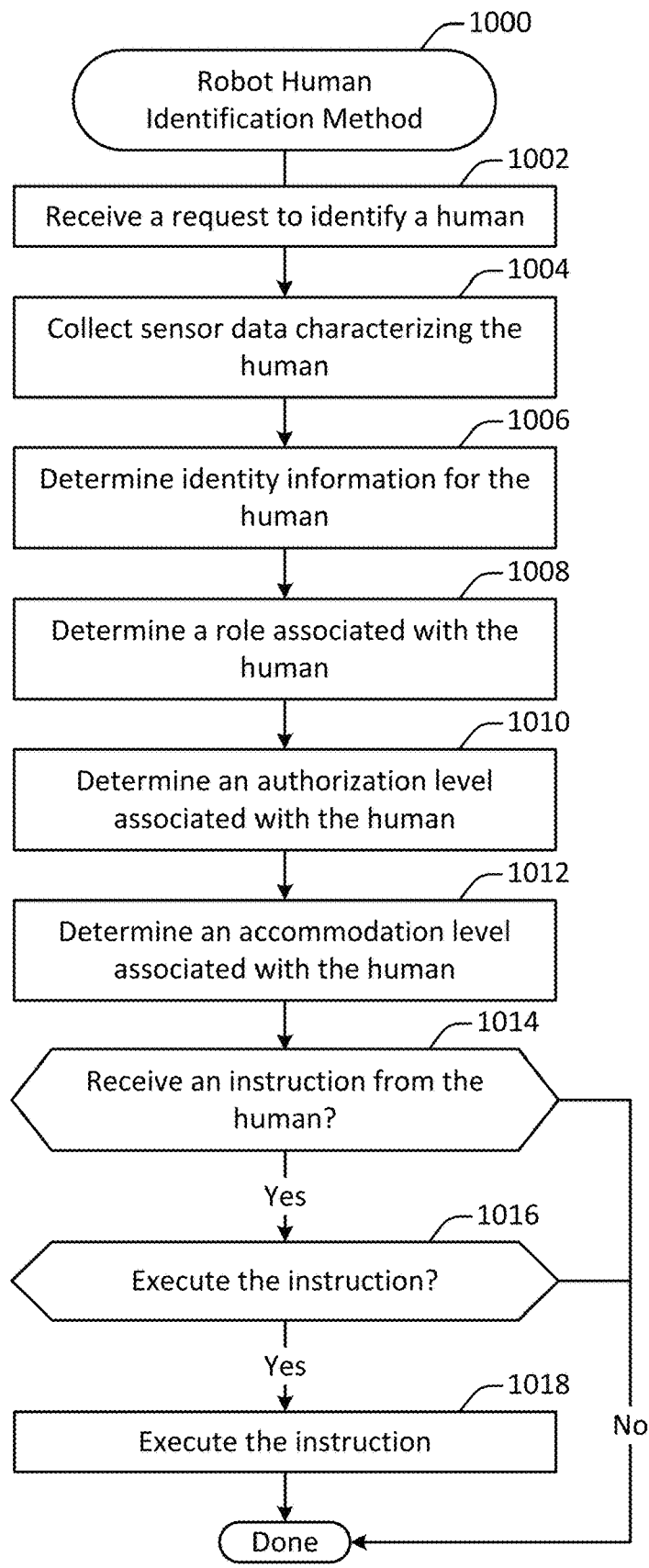
FIG. 10 illustrates a method for human identification by a robot, performed in accordance with one or more embodiments

FIG. 10 illustrates a method 1000 for human identification by a robot, performed in accordance with one or more embodiments. The method 1000 may be performed by the robot as part of, or in addition to, the execution of any other operations. For example, the method 1000 may be performed by the robot as it is navigating an environment, performing social accommodation, and/or executing a task. As another example, the method 1000 may be an example of a social disruption.

A request to identify a human is received at 1002. According to various embodiments, the request may be generated automatically, for instance whenever a human comes within a designated range of the robot. Alternatively, or additionally, the request may be generated when an event is detected. For instance, the request may be generated when a human instructs the robot to perform a task.

Sensor data characterizing the human is collected at 1004. According to various embodiments, various types of sensor data may be collected. For example, visual data such as video footage and/or one or more still images may be collected from a camera. As another example, an RFID sensor, barcode, or other such data may be read from an ID badge associated with the human.

When possible, identity information for the human is determined at 1006. In some implementations, the identity information may be determined at least in part by querying a remote database. For example, an image of a human may be used to query a remote database that links such images with information such as name and role. As another example, an ID barcode or RFID code may be used to query such a database. As still another example, an encrypted version of such a database may be locally stored on the robot to provide similar identification services in a more privacy-preserving manner.

A role associated with the human is determined at 1008. In some embodiments, when available, the role may be determined directly from the identity information determined at the operation 1006. Alternatively, or additionally, role information may be determined based on contextual cues. For example, an employee or manager in an office, industrial, or retail setting may be identified based on clothing or insignia. As yet another example, individuals having a particular role may carry a special identifier such as an RFID tag on a badge.

An authorization level for the human is determined at 1010. In some implementations, the authorization level may characterize the type of instructions that the human is authorized to give to the robot. For instance, a robot may be configured to act on any instructions from a designated maintenance operator. At the same time, the robot may be configured to act on a limited set of instructions from authorized persons such as doctors and nurses in a hospital, employees in an office setting, or managers in an industrial setting. The robot may be configured to ignore instructions from unauthorized individuals.

An accommodation level associated with the human is determined at 1012. According to various embodiments, the accommodation level may indicate a level of deference afforded to the human.

At 1014, a determination is made as to whether an instruction is received from the human. At 1016, if an instruction is received, a determination is made as to whether to execution the instruction, for instance based on the human's authorization level. If the decision is made to execute the instruction, then at 1018 the instruction is executed.

According to various embodiments, the instruction could be any instruction within the robot's command set. For example, the human could instruct the robot to transport an item to a designated location. As another example, the human could instruct the robot to move or stop moving. As yet another example, the human could instruct the robot to pause a task.

According to various embodiments, the robot may be configured to receive user input in any of a variety of ways. For example, a human may employ natural language to command the robot. Voice input may be provided to a microphone located on the robot, and/or through voice or typed text on a mobile phone, web application, or desktop application.

In some implementations, the robot may be configured to receive user input via hand gestures, for instance to facilitate contact-less interaction in noisy environments where speech recognition may be less accurate. Such gestures may be used for operations such as engaging or disengaging the robot, instructing it to start or stop tasks, providing yes or no answers, navigating a menu associated with the robot, pointing at regions or objects in the real world, making movements relative to a screen displaying visual information, or a variety of other gestures.

In some implementations, user input with the robot may be provided based on a remote user interface, for instance via a mobile phone, web application, or desktop application. In this way, a user may instruct and communicate with the robot when not co-present with it. Such interaction make take place via a graphical user interface, via spoken voice commands (e.g., a voice-based phone call), via a video call, or a combination thereof. When a user is co-present with the robot, information from a mobile device may be referenced during face-to-face interaction, and the mobile device used as an additional input device.

In some implementations, user input with the robot may be provided via near-field communication. For example, a user may authenticate or provide other information via an RFID badge.

In particular embodiments, touch-based user input may be used. Examples of such input may include, but are not limited to, touching options on a screen, pressing buttons, or activating touch sensors. For example, the robot may have capacitive and/or resistive touch sensors on the surface of its body. As another example, the robot may have torque sensing at joints, which may help to detect contact for a variety of reasons (e.g., safety).

Figure 11:
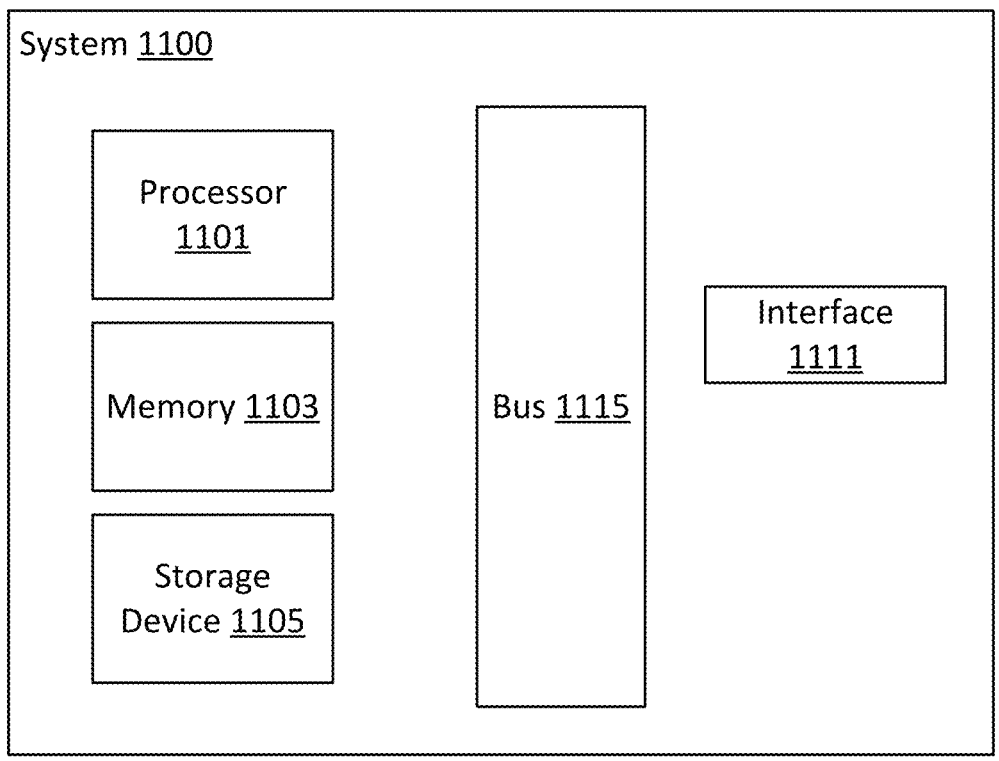
FIG. 11 illustrates one example of a computing device, configured in accordance with one or more embodiments.

FIG. 11 illustrates one example of a computing device. According to various embodiments, a system 1100 suitable for implementing embodiments described herein includes a processor 1101, a memory module 1103, a storage device 1105, an interface 1111, and a bus 1115 (e.g., a PCI bus or other interconnection fabric.) System 1100 may operate as variety of devices such as robot, remote server, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. The interface 1111 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

FIGS. 12 through 15 illustrate diagrams generated in accordance with one or more embodiments. The diagram 1202 illustrates a perspective view of an environment, while the diagram 1204 illustrates a top-down view of the same environment. One or more such views may be generated by the robot 1206 as it collects information about a physical space. A two-dimensional, top-down view such as the view 1204 may allow the robot 1206 to reason about its environment, for instance to determine a path to reach an objective.

According to various embodiments, the robot's field of view according to one or more sensors is illustrated by the shaded region 1208. The robot cannot directly observe the regions 1214 and 1216 since those regions are blocked by the box 1218 and the person 1220.

The regions 1210 and 1212 represent an active scan of the robot's environment, for instance using cameras. Visual data may be used to perform tasks such as object recognition, person identification, or identification of obstacles that are located on a plane different from two-dimensional depth sensors.

The robot 1206 is attempting to navigate to the point 1222 in the environment. However, the most direct path to the point 1222 is blocked by the person 1220, who is walking through the environment. The person's most recent position according to sensor data is illustrated at 1230. Accordingly, the robot may predict a projected trajectory 1224 for the person 1220 and then determine a path 1226 that avoids the person. The path 1226 may be determined to, at a minimum, avoid collision with the person 1220. In some configurations, the path may be determined to avoid collision with the person 1220 by a minimum distance. For instance, the robot may determine a path to the point 1226 that is the shortest path that avoids putting the robot within three feet of the person 1220.

Figure 12:
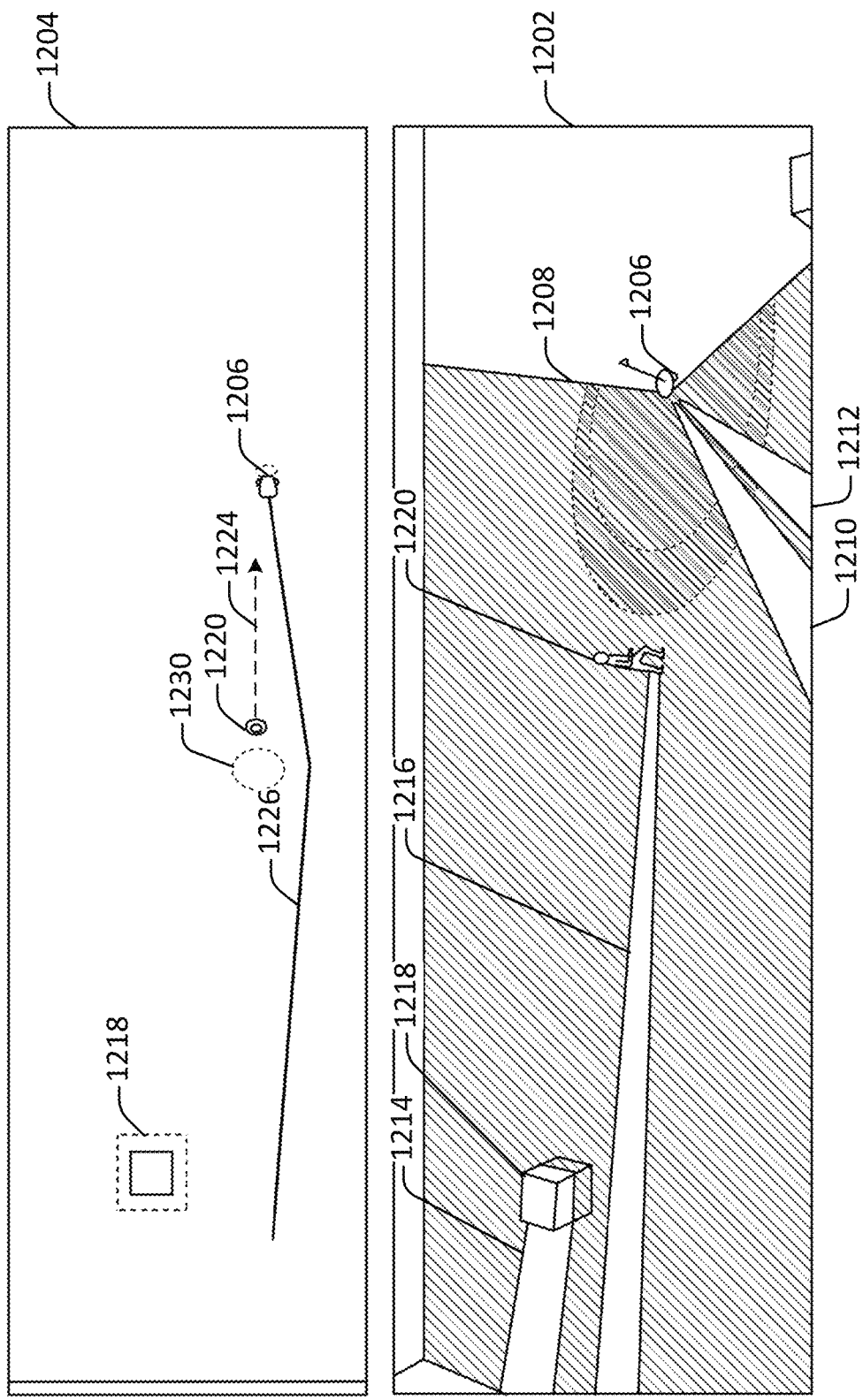
FIG. 12, FIG. 13, FIG. 14, and FIG. 15 illustrate diagrams generated in accordance with one or more embodiments.
Figure 13:
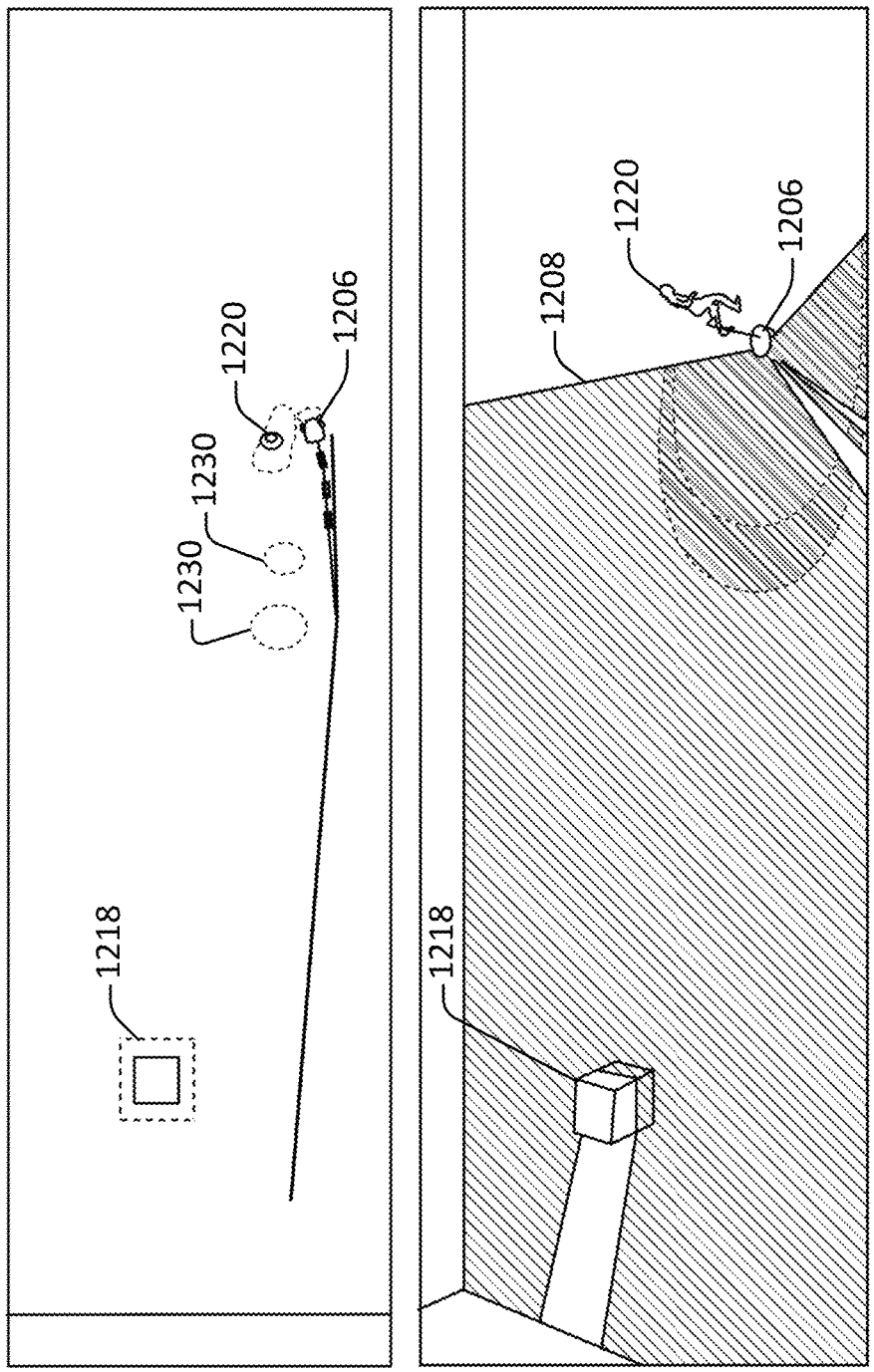
Figure 14:
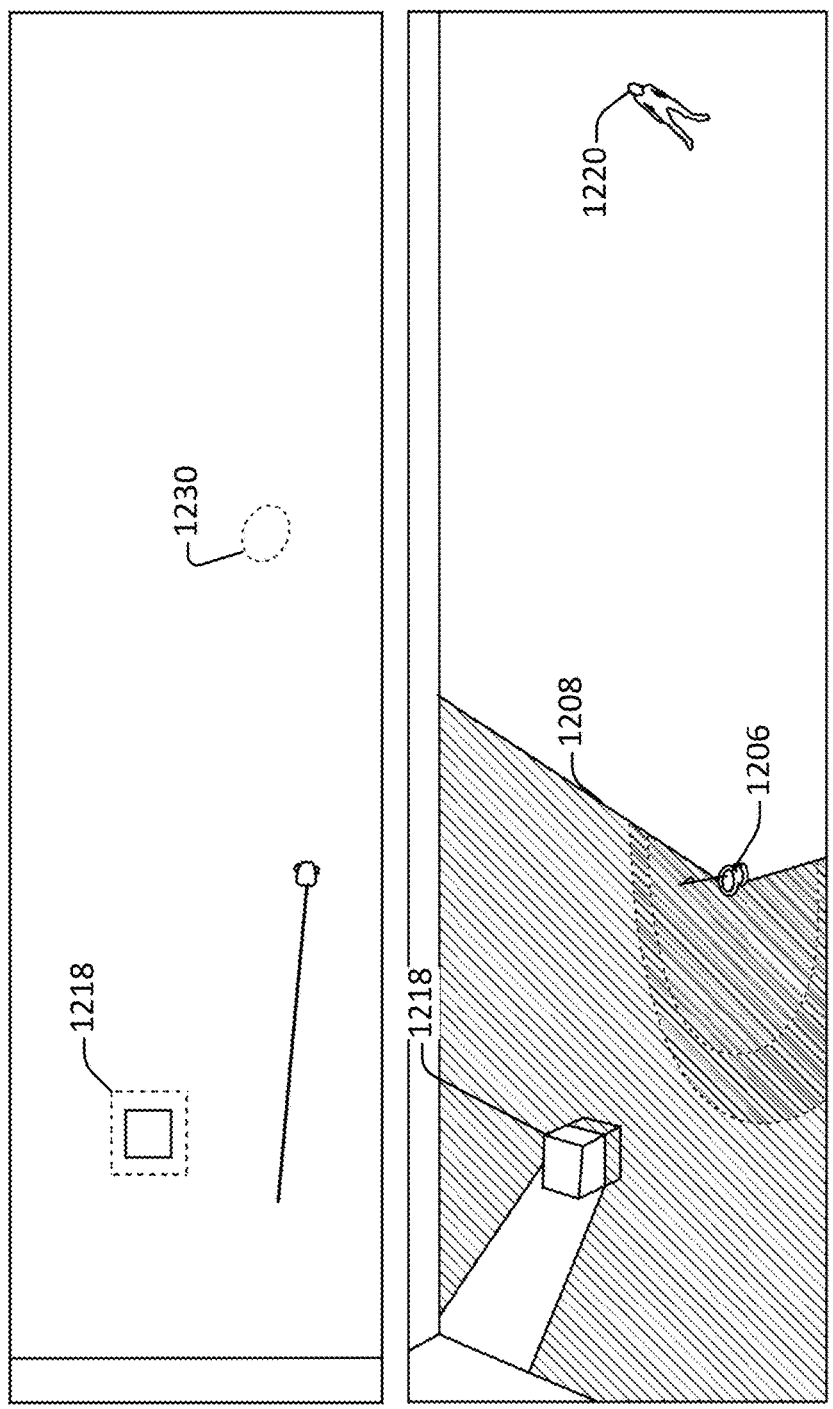
Figure 15:
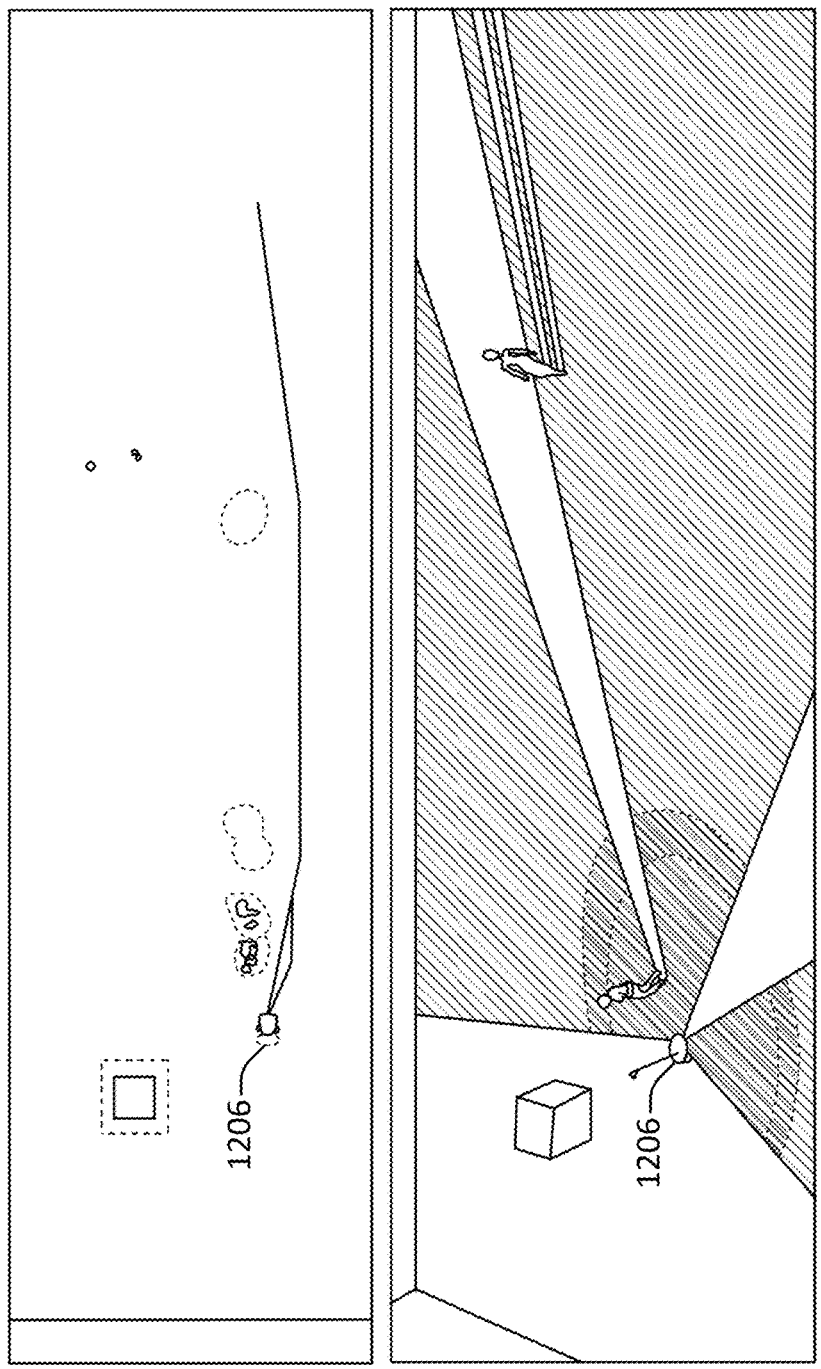

In FIGS. 12 and 14, the robot is shown moving along the updated path and avoiding the human. In this way, the robot can socially accommodate the human instead of requiring that the human change course to accommodate the robot. In FIG. 15, the robot is shown on a reverse course. Due to the location and predicted path of the humans in the room, the reverse path to the original location is different than the original path.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of item transportation tasks. However, the techniques of the present invention apply to a wide variety of tasks. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A robotic cart comprising:
a base component configured for receipt of a payload and including a battery unit comprising one or more batteries;
a mobility apparatus coupled with the base component;
a handlebar component coupled with the base component;
a first sensor unit configured to transmit a hand detection message when the handlebar component is grasped by one or more hands, the first sensor unit including a force sensor configured to detect a translational direction associated with a translational force applied by the one or more hands, the first sensor unit further including a torque sensor configured to detect a rotational direction and rotational magnitude of a rotational force applied by the one or more hands, the first sensor unit being further configured to transmit one or more force messages indicating the translational direction, the rotational direction, and the rotational magnitude;
a second sensor unit configured to detect one or more objects in an area proximate to the robotic cart and to transmit one or more area mapping messages; and
a control unit configured to:
analyze the one or more area mapping messages to autonomously determine a path through a physical space to perform a task while avoiding collisions with the one or more objects,
communicate with the mobility apparatus to autonomously move the robotic cart along the path to perform the task,
enter a manual operation mode based on receiving the hand detection message, and
communicate with the mobility apparatus to move the robotic cart in accordance with the translational direction, the rotational direction, and the rotational magnitude based on the one or more force messages, wherein moving the robotic cart includes rotating the robotic cart around an axis, and wherein communicating with the mobility apparatus to move the robotic cart involves determining whether such movement is predicted to cause a collision with the one or more objects.

2. The robotic cart recited in claim 1, when it is determined that such movement is predicted to cause a collision with the one or more objects, communicating with the mobility apparatus to avoid the collision.

3. The robotic cart recited in claim 1, wherein the one or more objects includes a human.

4. The robotic cart recited in claim 1, wherein the robotic cart further comprises a display screen configured to display an indication of a status associated with the robotic cart.

5. The robotic cart recited in claim 4, wherein the display screen is a touch screen display configured to receive user input and to transmit the user input to the control unit.

6. The robotic cart recited in claim 4, wherein the display screen is coupled with the handlebar component.

7. The robotic cart recited in claim 4, wherein the display screen includes an optical sensor configured to capture image data in an area proximate to the robotic cart, and wherein the robotic cart is configured to process the image data to identify a human.

8. The robotic cart recited in claim 4, wherein the display screen is configured to rotate about an axis to face a human when a human is detected in an area proximate to the robotic cart.

9. The robotic cart recited in claim 1, wherein the handlebar component includes two vertical bars coupled with the base component and one or more horizontal bars coupled with the two vertical bars, the horizontal bar being coupled with the two vertical bars via two joint units, each of the joint units including a respective force torque sensor.

10. The robotic cart recited in claim 1, wherein the mobility apparatus includes four omnidirectional wheels that each include a plurality of rollers arranged around a rim.

11. The robotic cart recited in claim 1, wherein the second sensor unit comprises a plurality of visible light cameras located on the base component.

12. The robotic cart recited in claim 11, wherein the plurality of visible light cameras collectively provide a 360-degree view of the area proximate to the robotic cart.

13. The robotic cart recited in claim 11, wherein the plurality of visible light cameras are also configured to detect infrared light.

14. The robotic cart recited in claim 13, further comprising one or more infrared light sources.

15. The robotic cart recited in claim 1, wherein the base component includes one or more power couplings configured to provide power from the battery unit to the payload.

16. The robotic cart recited in claim 1, wherein the base component includes one or more attachment points configured to physically secure the payload to the base component.

17. The robotic cart recited in claim 1, wherein the base component includes one or more attachment points configured to facilitate communication between the control unit and the payload.

18. The robotic cart recited in claim 1, wherein the payload comprises a robotic arm configured to move an item between the robotic cart and a different location based on an instruction received from the control unit.

19. The robotic cart recited in claim 1, wherein the payload comprises a lift apparatus configured to move an item in a vertical direction.

20. The robotic cart recited in claim 19, wherein the lift apparatus includes an item mobility apparatus configured to push or pull the item in a horizontal direction.

21. The robotic cart recited in claim 1, wherein the payload comprises a cabinet unit including a refrigeration apparatus configured to refrigerate the cabinet unit using power received from the battery unit.

22. The robotic cart recited in claim 1, wherein the payload comprises a conveyer belt configured to receive power from the battery unit and move an item in a horizontal direction based on input from the control unit.

23. A method comprising:
- receiving from a first sensor unit one or more area mapping messages providing information about one or more objects detected in an area proximate to a robotic cart, the robotic cart including a base component configured for receipt of a payload and including a battery unit comprising one or more batteries, the robotic cart also including a mobility apparatus coupled with the base component;
- analyzing via a processor the one or more area mapping messages to autonomously determine a path through a physical space to perform a task while avoiding collisions with the one or more objects;
- communicating with the mobility apparatus to autonomously move the robotic cart along the path to perform the task;
- receiving a hand detection message from a second sensor unit coupled with a handlebar component, the handlebar component coupled with the base unit, the hand detection message indicating that the handlebar component has been grasped by one or more hands;
- enter a manual operation mode based on receiving the hand detection message;
- receiving from the second sensor unit one or more force messages, the second sensor unit including a force sensor configured to detect a translational direction associated with a translational force applied by the one or more hands, the second sensor unit further including a torque sensor configured to detect a rotational direction and rotational magnitude of a rotational force applied by the one or more hands, the one or more force messages indicating the translational direction, the rotational direction, and the rotational magnitude; and
- communicating with the mobility apparatus to move the robotic cart in accordance with the translational direction, the rotational direction, and the rotational magnitude based on the one or more force messages, wherein moving the robotic cart includes rotating the robotic cart around an axis, and wherein communicating with the mobility apparatus to move the robotic cart involves determining whether such movement is predicted to cause a collision with the one or more objects.

24. One or more computer readable media having instructions stored thereon for performing a method, the method comprising:
- receiving from a first sensor unit one or more area mapping messages providing information about one or more objects detected in an area proximate to a robotic cart, the robotic cart including a base component configured for receipt of a payload and including a battery unit comprising one or more batteries, the robotic cart also including a mobility apparatus coupled with the base component;
- analyzing via a processor the one or more area mapping messages to autonomously determine a path through a physical space to perform a task while avoiding collisions with the one or more objects;
- communicating with the mobility apparatus to autonomously move the robotic cart along the path to perform the task;
- receiving a hand detection message from a second sensor unit coupled with a handlebar component, the handlebar component coupled with the base unit, the hand detection message indicating that the handlebar component has been grasped by one or more hands;
- enter a manual operation mode based on receiving the hand detection message;
- receiving from the second sensor unit one or more force messages, the second sensor unit including a force sensor configured to detect a translational direction associated with a translational force applied by the one or more hands, the second sensor unit further including a torque sensor configured to detect a rotational direction and rotational magnitude of a rotational force applied by the one or more hands, the one or more force messages indicating the translational direction, the rotational direction, and the rotational magnitude; and
- communicating with the mobility apparatus to move the robotic cart in accordance with the translational direction, the rotational direction, and the rotational magnitude based on the one or more force messages, wherein moving the robotic cart includes rotating the robotic cart around an axis, and wherein communicating with the mobility apparatus to move the robotic cart involves determining whether such movement is predicted to cause a collision with the one or more objects.

* * * * *